US007257767B1

(12) United States Patent
Carden, Jr.

(10) Patent No.: US 7,257,767 B1
(45) Date of Patent: *Aug. 14, 2007

(54) SYSTEM AND METHOD FOR PUBLISHING DOCUMENTS

(76) Inventor: William T. Carden, Jr., 10 Sunset Cir., Charlottesville, VA (US) 22901

( * ) Notice: Subject to any disclaimer, the term of this patent is extended or adjusted under 35 U.S.C. 154(b) by 0 days.

This patent is subject to a terminal disclaimer.

(21) Appl. No.: 09/501,169

(22) Filed: Feb. 9, 2000

Related U.S. Application Data

(60) Provisional application No. 60/119,524, filed on Feb. 9, 1999.

(51) Int. Cl.
*G06F 15/00* (2006.01)
*G06F 17/00* (2006.01)

(52) U.S. Cl. .............. 715/511; 715/500.1; 715/501.1; 715/512; 715/513; 715/514; 715/530; 715/531; 715/523; 715/751; 707/9; 707/10; 707/101; 707/102

(58) Field of Classification Search ............. 707/1–6, 707/9–10, 100–104.1, 200–205; 715/500.1, 715/501.1, 511–514, 530–531, 523, 751; 345/751

See application file for complete search history.

(56) References Cited

U.S. PATENT DOCUMENTS

| 5,181,162 A | 1/1993 | Smith et al. |
| 5,203,001 A * | 4/1993 | Yanagiuchi et al. ......... 711/100 |
| 5,220,657 A | 6/1993 | Bly et al. |
| 5,664,183 A | 9/1997 | Cirulli et al. |
| 5,671,428 A | 9/1997 | Muranaga et al. |
| 5,706,452 A * | 1/1998 | Ivanov ....................... 345/751 |
| 5,745,360 A | 4/1998 | Leone et al. |
| 5,778,367 A | 7/1998 | Wesinger, Jr. et al. |
| 5,799,191 A | 8/1998 | Moriyasu et al. |
| 5,870,552 A | 2/1999 | Dozier et al. |

(Continued)

FOREIGN PATENT DOCUMENTS

| WO | WO 94-08310 | 4/1994 |
| WO | WO 98-01807 | 1/1998 |
| WO | WO 99/04370 | 1/1999 |

OTHER PUBLICATIONS

International Preliminary Examination Report (IPER) from PCT application PCT/US00/03415, Jan. 18, 2001.

(Continued)

*Primary Examiner*—Doug Hutton
*Assistant Examiner*—N Hillery
(74) *Attorney, Agent, or Firm*—Venable LLP; James R. Burdett; Jeffri A. Kaminski

(57) ABSTRACT

A publishing system includes a database that is adapted to store a plurality of documents, a plurality of computers, each of which is adapted to be coupled to the database; a network connecting the plurality of computers together for communication of data relating to the plurality of documents among the plurality of computers and the database, means for submitting a new document to the database, means for reviewing the new document, means for relating the new document to the plurality of documents, and means for publishing a journal of a selected portion of the plurality of documents. The plurality of computers includes a server and a plurality of clients, and the server is a web server with the plurality of clients each further including a browser.

61 Claims, 16 Drawing Sheets

U.S. PATENT DOCUMENTS

| | | | |
|---|---|---|---|
| 5,890,177 A | | 3/1999 | Moody et al. |
| 5,892,909 A | | 4/1999 | Grasso et al. |
| 5,893,109 A | | 4/1999 | DeRose et al. |
| 5,948,040 A | * | 9/1999 | DeLorme et al. ........... 701/201 |
| 5,987,454 A | * | 11/1999 | Hobbs ........................... 707/4 |
| 6,088,702 A | | 7/2000 | Plantz et al. |
| 6,336,124 B1 | * | 1/2002 | Alam et al. .................. 715/523 |
| 6,374,274 B1 | * | 4/2002 | Myers et al. ................ 715/523 |

OTHER PUBLICATIONS

International Search Report (ISR) from PCT application PCT/US00/03415, May 15, 2000.

ISR from PCT application PCT/US00/14097, Dec. 4, 2000.

Written Opinion from PCT application PCT/US00/14097, Jun. 1, 2001.

IPER from PCT application PCT/US00/14097, Nov. 21, 2001.

Supplemental European Search Report from EP application 00937677.3, Feb. 3, 2004.

Tribute A: "SII Adopts Lotus Notes As Basis for Its New Editoral Systems. (Cover Story)" Seybold Report on Publishing Systems, Media, PA, US, vol. 28, No. 3, Oct. 12, 1998, pp. 1-8, XP002934600.

Florio, Susan: "Notes R5: Calendar & Scheduling" Internet Article, 'Online! Dec. 1, 1998, XP002348509.

* cited by examiner

SYSTEM AND METHOD FOR PUBLISHING DOCUMENTS

CROSS-REFERENCE TO RELATED APPLICATIONS

This application is related to a provisional patent application Ser. No. 60/119,524, filed Feb. 9, 1999 by William T. Carden, Jr., and entitled "Online Document Submission, Review, and Publishing System", which is commonly assigned to the assignee of the present invention and incorporated herein by reference.

The present application is related to U.S. patent application Ser. No. 09/576,386, Confirmation No. 1657, filed May 22, 2000, entitled "System and Method for Publishing Manuscripts," to William T. Carden, Jr., of common assignee to the present application.

BACKGROUND OF THE INVENTION

1. Field of the Invention

The present invention is related generally to document publishing systems and methods, and more particularly to such systems and methods that enable authors to submit abstracts, manuscripts, articles, and other text, graphics, and multimedia documents through computer networks in order to facilitate the substantially immediate review, editing and publishing of such documents.

2. Statement of the Invention

The submission, review, acceptance, and publication of documents, particularly written materials, is a lengthy and time-consuming process using the conventional procedures according to the prior art. The "World Wide Web" (more commonly referred to as the "Internet") has dramatically decreased the time needed to communicate such documents to a publisher. However, there are still difficulties that are encountered in handling most forms of written material. The written materials, once submitted, must be centrally filed and managed through every step of approval between their initial submission and final publication. From an author's perspective, it would be easy to simply attach a document to an "e-mail", and send that e-mail and document to a society for publication. However, it would still be difficult for the author to monitor the society's approval process. That process, too, would require the society to read, sort, and handle thousands of randomly formatted documents—a monumental task for any organization.

In a preferred embodiment of the present invention, a centralized system that avoids such problems is provided. Such a system enables an author to submit text, graphics, and multimedia documents to a second party through the Internet. Moreover, the system overcomes management problems by enabling a second party or "publishing authority" (e.g., a society, corporation, central organization, publisher, etc.) to easily process standardized materials, from receipt to publication, via the Internet.

SUMMARY OF THE INVENTION

The disclosed system and methods enable authors to submit written materials to a publisher, society or agency, preferably through the Internet, for immediate review, editing and publishing. All "correspondence", review, and approval of such documents is handled through the Internet, and stored centrally for subsequent access by appropriate parties in order to complete the submission to publication process.

One of the unique features of the present invention is its flexibility and ease of modification to accommodate any specific publisher or agency requirements. Preferably, the system is hosted on a central provider's computer, and accessed by all involved parties from that site. This architecture enables a third-party provider to maintain the program and, thus, free subscribing publishers from any need to monitor the system. The use of a database that automatically stores the materials in the desired format enables the provider to easily display documents online, print such document in hard copy or portable data file format, or transfer to a CD ROM for presentation. Documents originally transmitted by the author to the database in ASCII format are dynamically changed by the system to generate an HTML or PDR proof for review by the author. Such use of HTML (and succesor formats to HTML, e.g., SGML, VRML, XML) provides a universal format, which facilitates online proofing, review by experts, scheduling of presentations, and subsequent publishing to hard copy or digital formats.

In accordance with a general embodiment of the present invention, the publishing system generally comprises a database adapted to store a plurality of documents; a plurality of computers, each of which is adapted to be coupled to the database; a network connecting the plurality of computers together for communication of data relating to the plurality of documents among the plurality of computers and the database; means for submitting a new document to the database; means for reviewing the new document; means for relating the new document to the plurality of documents; and means for publishing a journal of a selected portion of the plurality of documents. The plurality of computers preferably comprise a server and a plurality of clients. More preferably, the server comprises a web server and the plurality of clients each further comprise a browser.

The submitting means further comprises first means for translating the new document from a first data format to a second data format. Most preferably, the first data format comprises a native word processor format and the second data format comprises a format compatible to the browser. The publishing means additionally comprises second means for translating the selected portion of the plurality of documents from the second data format to a third data format. Preferably, the third data format comprises a format that is selected from conventional typesetting/page layout formats (e.g., Postscript or PDF).

In an especially preferred embodiment of the present invention, the server further comprises means for searching the database. The system may likewise comprise a removable medium, which is adapted to store the database and includes the means for searching the database. In that case, the removable medium may further comprise means for communicating with the server, preferably by way of the browser.

A publishing method according to the present invention generally comprises a nine-step process. First, a suitable computer system must be provided at one location. The computer system comprises a database that is adapted to store a plurality of documents, a plurality of computers including a web server and a plurality of clients, each of which is adapted to be coupled to the database through a browser, and a network connecting the plurality of computers together for communication of data relating to the plurality of documents among the plurality of computers and the database. Second, a new document is input to the computer system from another location displaced remotely from the one location, the new document having been input in a native word processor format, Third, the new document is translated from the native word processor format to a format compatible with the browser, then stored. The new document is then related to the plurality of documents, and accessed in the browser-compatible format. Review and approval of the new document is subsequently done in the browser-compatible format. Then, the new document can be translated from the browser-compatible format to a typesetting format. Publication of a journal of the selected portion of the plurality of documents can ultimately be done in the typesetting format, the browser-compatible format, or any suitable portable document file format.

Once the document is submitted, the method then comprises the step of assigning a reviewer to review the new document, the reviewer being located at a third location displaced remotely from the one location and the other location. The reviewer may then be notified through the network that the new document is available for review. Similarly, approval may be done through the same steps.

In another embodiment of the present invention, the publishing system generally comprises a database adapted to store a plurality of documents, each of which was written by one or more authors in a native word processor format; first server means for managing the database; second server means for hosting an Internet website that is accessible by a plurality of clients, each of which is adapted to be coupled to the database through a browser; a first code segment for submitting a new document to the database in the native word processor format; a second code segment for translating the new document from the native word processor format to a browser-compatible format; a third code segment for reviewing the new document in the browser-compatible format; a fourth code segment for relating the new document to the plurality of documents; a fifth code segment for translating the plurality of documents from the browser-compatible format to a typesetting format; and means for publishing the journal in the typesetting format of a selected portion of the plurality of documents. It should be noted at this juncture that, by use of the term "journal" herein, the invention is not deemed to be limited to journals per se. A book, proceedings, compilation, corporate publication or marketing collateral, web page, "e-zine", etc. each is deemed to fall within the scope of the present invention.

Preferably, the system further comprises a sixth code segment for publishing the journal on the Internet website in the browser-compatible format. The Internet website is usually attributable to an organization, the one or more authors are typically members of the organization, the selected portion is adapted to be published in advance of a meeting of the organization, and a plurality of attendees is scheduled to attend the meeting. In this case, the system further comprises a seventh code segment to facilitate access to the Internet website by the plurality of attendees; and an eighth code segment for making reservations at a site of the meeting. Such eighth code segment further comprises a first code subsegment for registering to attend the meeting; a second code subsegment for reserving a room at a hotel at the site; a third code subsegment for reserving transportation to the site; and a fourth code subsegment for purchasing materials adapted to be distributed at the meeting.

Most preferably, the system further comprises a ninth code segment adapted to store data in the database relating to a plurality of responses to the eighth code segment by the plurality of attendees, and manipulate and display the data in the browser-compatible format for review on the Internet website by one or more planners of the meeting. Means for searching the database may be provided by a tenth code segment. Finally, an eleventh code segment for publishing the journal in a format compatible with a removable medium is provided. The removable medium then includes a twelfth code segment for searching the journal, a thirteenth code segment for planning an itinerary of an attendee of the meeting, and a fourteenth code segment for prompting the attendee of changes to that itinerary.

Other objects, advantages, and novel features of the present invention will become readily apparent from the following detailed description thereof, when considered in conjunction with the accompanying drawings wherein:

DETAILED DESCRIPTION OF THE INVENTION

Figure 1:
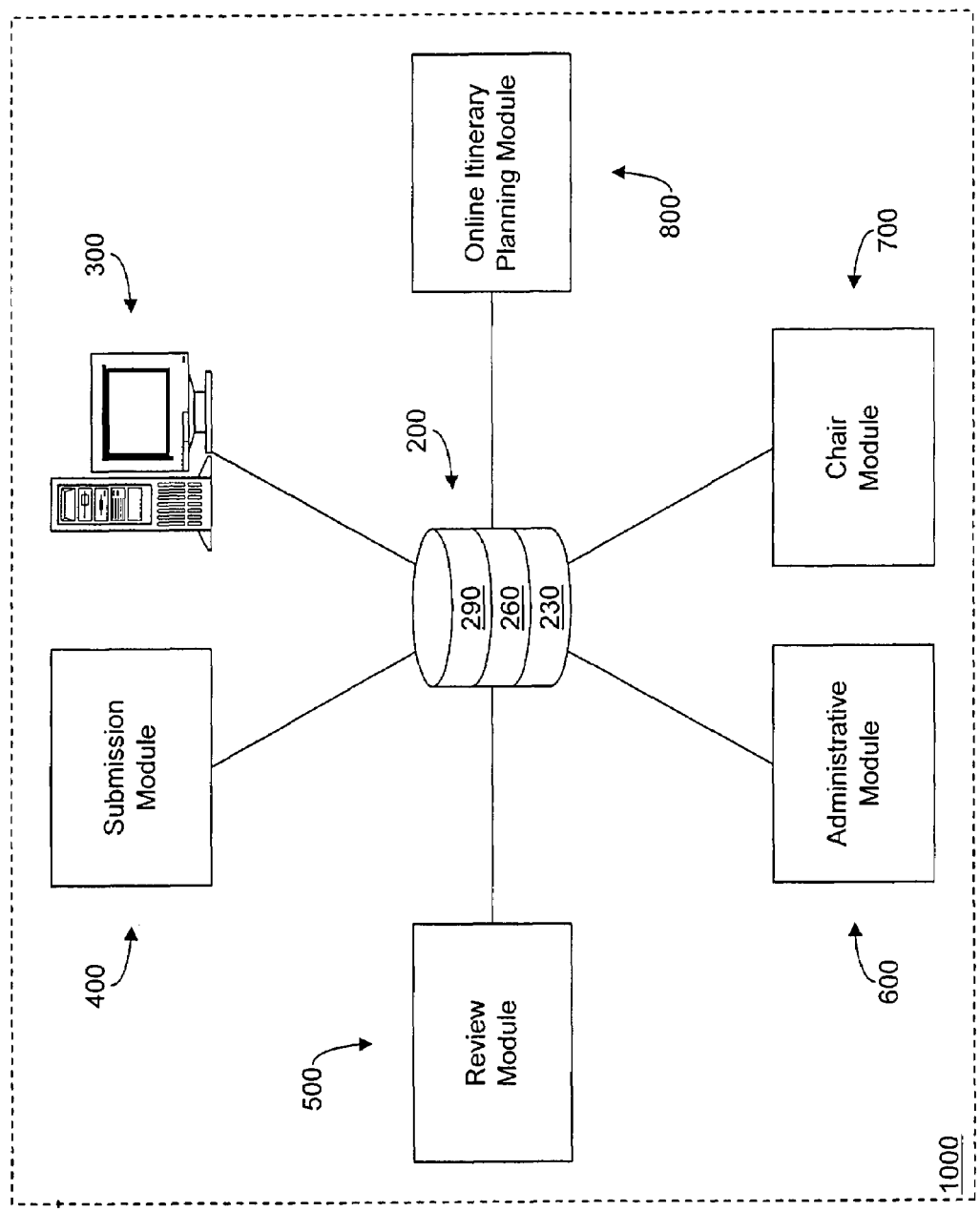
FIG. 1 is a block diagram of an online document processing system according to the present invention.

The disclosed system enables authors to submit abstracts, manuscripts, articles, graphics, multimedia, and other written materials through the Internet, thereby permitting the submitted materials to be immediately available for review, editing and publishing. Prior art methods require the mailing or e-mailing of materials from author to publisher, from publisher to reviewer, reviewer to publisher, etc. In the disclosed system, however, all such correspondence is handled through the Internet, and centrally-stored materials are accessed by the appropriate parties to complete the submission to publication process. It should be noted at this juncture that, within the disclosed system, use of the term "publication" refers to any display of written materials, whether it is over the Internet, intranet, CD ROM or hard copy. Although one of the most applicable uses of the disclosed system is the submission of articles to meetings and publications, the system can readily be adapted to other submissions, such as SBIR, STTR and/or NIH grants, academic applications or examinations, corporate proposals and the like.

Adaptation of the system for internal use, especially within companies having a number of corporate sites, enables the submission and review of proposals, contracts, promotional materials, etc., to be handled efficiently and rapidly. The processing of a submission may vary dependent upon the particular publication, and the flow of the systems disclosed herein are by way of example only and do not, in any way limit the invention. The disclosed system is applicable for Internet submission, review, revision and publication of any written data, video, multimedia, streaming video and, although for brevity reference will be made herein to submissions to societies, it is not limited to the examples provided herein. Security features, such as encrypting, access codes, etc., can also be required, dependent upon the parties, and will be obvious to those skilled in the art.

One of the unique features of the disclosed system is its flexibility and ease of modification to accommodate any specific publisher requirements. The system is preferably hosted on a central provider's computer and accessed by all involved parties from that site. Publications and societies subscribe to the provider's service, at which point all authors, editors, reviewers, and administrative or editorial staff only need to access the appropriate module on the site. This enables the provider to maintain the program, freeing the subscribing publishers from any need to monitor the system. Use of a database that automatically stores the materials in the desired format enables the provider to easily display the material on line, print in hard copy or transfer to a CD ROM for presentation. The written materials are originally transmitted from the author to the database in ASCII format, and the system dynamically generates an HTML proof for review by the author. Use of the HTML format, thus, provides a universal format permitting the online proofing, review by experts, scheduling of presentations and publishing to the public. Alternatively, the system can be installed on a specific publisher's computer system, and various participants can interact directly with such computer system.

The system enables dynamic e-mails to the parties interacting in the process to acknowledge the states of the materials. Dynamic e-mails are advantageous in notifying the involved parties of the current states of the written materials, such as notifying a reviewer of an abstract to be reviewed or confirming a presentation time to a speaker.

Figure 2:
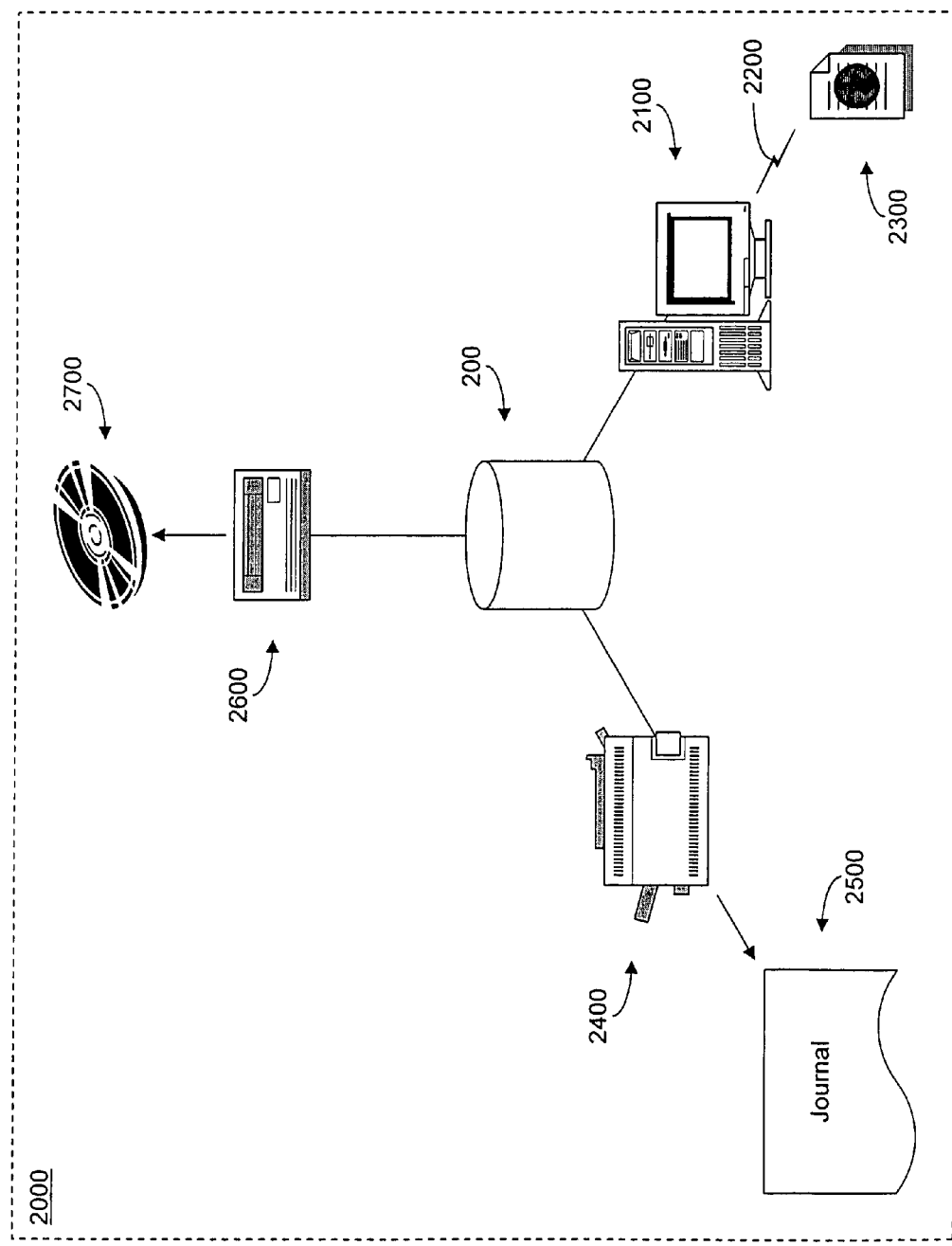
FIG. 2 illustrates varied methods of publishing using the online document processing system shown in FIG. 1 in accordance with the present invention.

Referring now to the drawings, wherein like reference characters and numerals designate like or corresponding parts throughout each of the several views, there is shown in FIG. 1 an online document processing system 1000 according to the present invention. Such system 1000 broadly includes a database 200 (which may be split into partitions 230, 260, 290), a server 300 connected to the database 200, and five basic modules 400, 500, 600, 700, and 800. Submission module 400 is used by authors to submit their documents for consideration by reviewers, administrative staff, committee chairs, and corporate divisions, respectively by modules 500, 600, and 700. An online itinerary planning module 800 facilitates real-time scheduling by conference attendees. System 1000 is customized to the requirements of the specific publisher, providing a consistent submission method for easier review and publication. The author uses the submission module 400 to prepare the forms and written materials, transmitting the completed material, over Internet, to the database 200. Once in the database 200, as is better illustrated in FIG. 2, the document is not only available for review and a determination whether to accept the submission as presented or request revisions, but also the document can be published in any number of formats. The document may be sent, for example, from the database 200 to a web server 2100 over the Internet 2200 to publish an HTML document 2300 in the form of a web page. Likewise, the document may be sent from database 200 through any conventional typesetting printer (diagrammatically shown as a laser printer in FIG. 2) 2400 to publish a hard copy document 2500. The document may also be sent from database 200 through a CD-ROM writer 2600 to produce a CD-ROM. Preferably, electronic sign-off or approval enables the submitting author to approve the submission after viewing its HTML proof.

Figure 3:
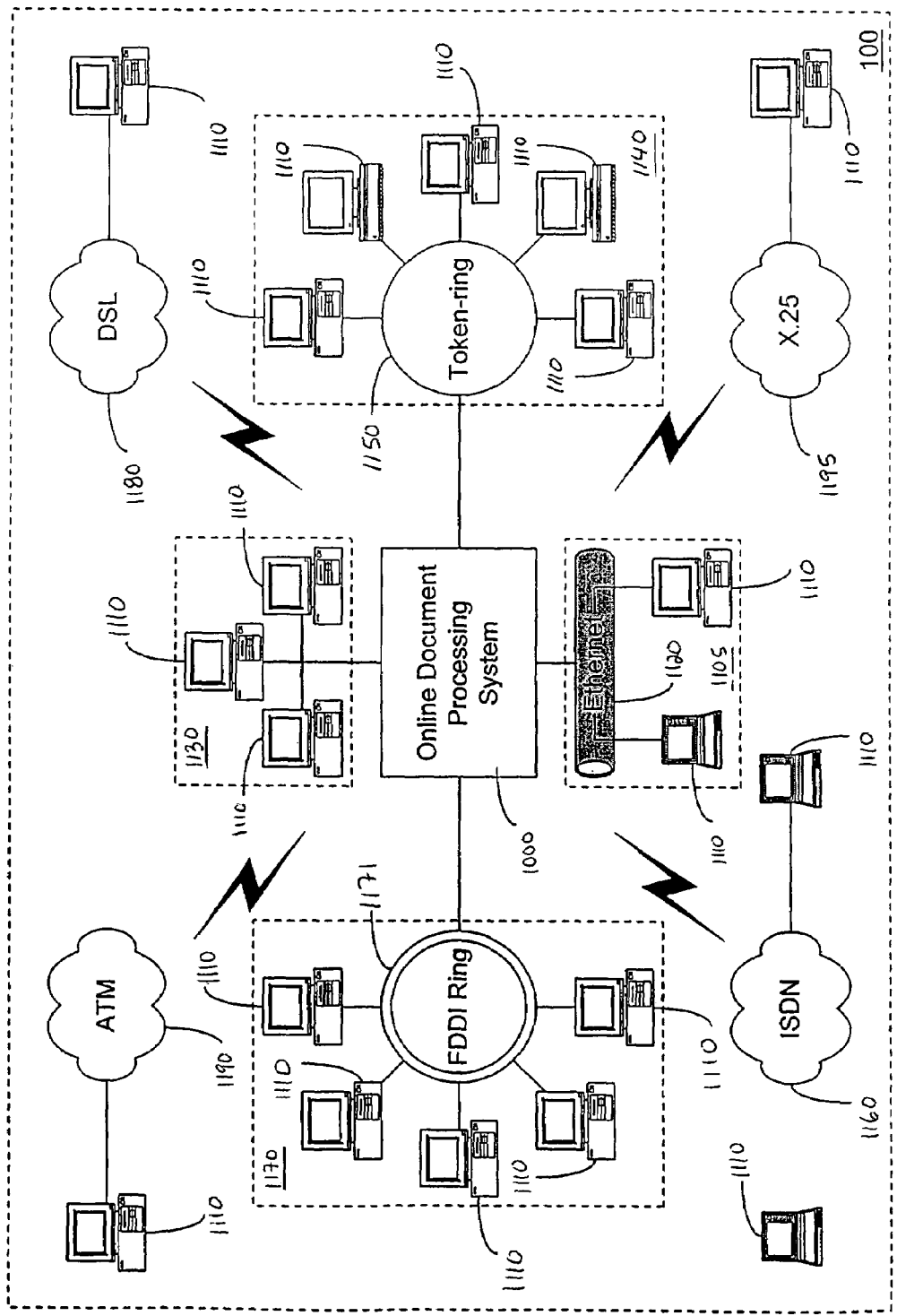
FIG. 3 is a block diagram of a publishing system according to the present invention.

A publishing system 100 according to the present invention is not necessarily limited to the Internet. As shown in FIG. 3, publishing system 100 includes the online document processing system 1000, and a plurality of networked computer clients 1110. Conventional Ethernet networks 1105 such as the network coupling a pair of clients 1110 through an Ethernet bus 1120, or the star network 1130 coupling a plurality of clients 1110, may be used to connect the clients 1110 to system 1000. Likewise, higher speed Ethernet networks, such as network 1140 using a token ring 1150 may connect the clients 1110 to system 1000. Even higher speed networks, such as the ISDN network 1160, FDDI network 1170, DSL network 1180 and ATM network 1190 may be used. Conventional X.25 type networks are accommodated as well.

Figure 4:
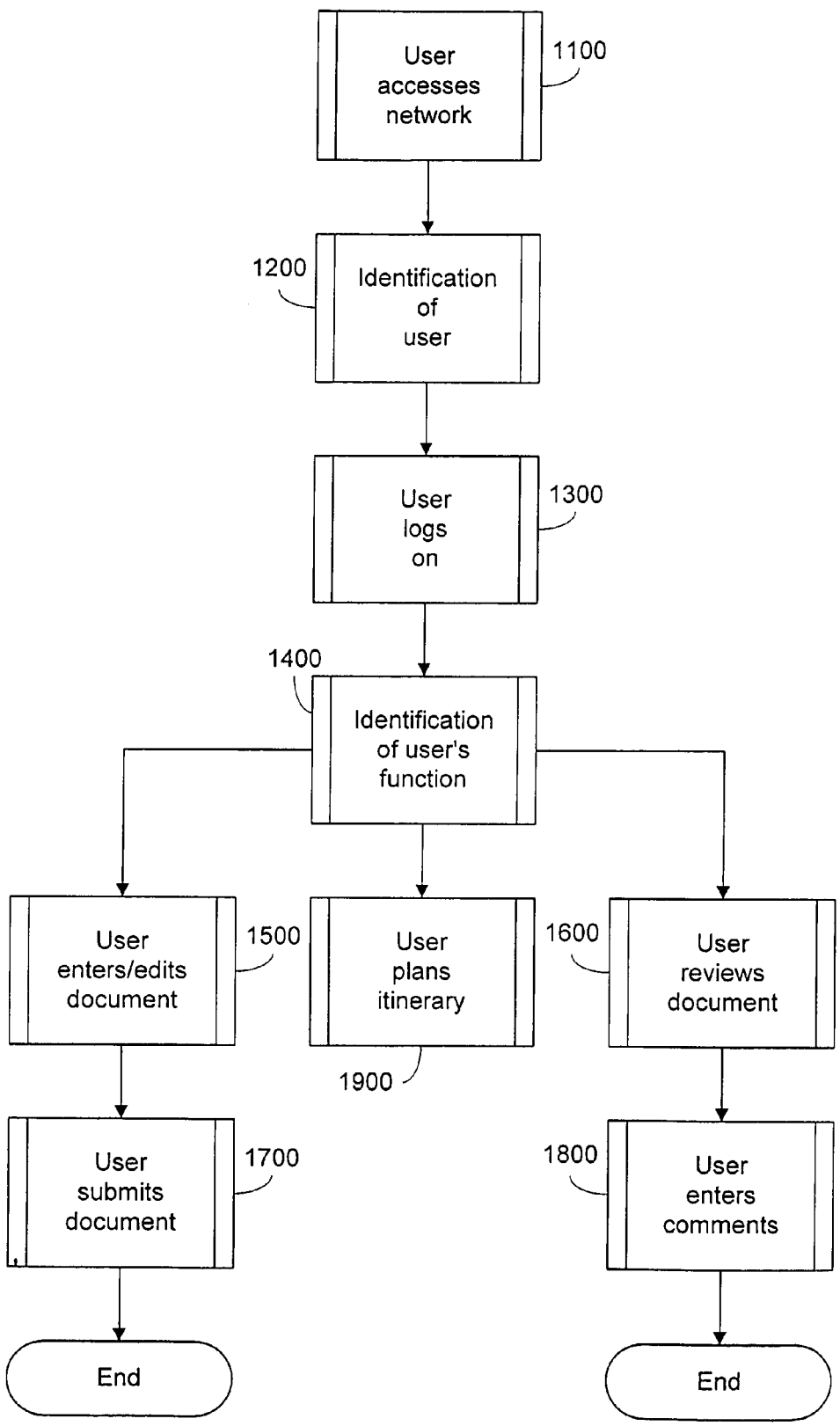
FIG. 4 is a generalized flowchart of methods of processing a document using the publishing system shown in FIG. 3.
Figure 5A:
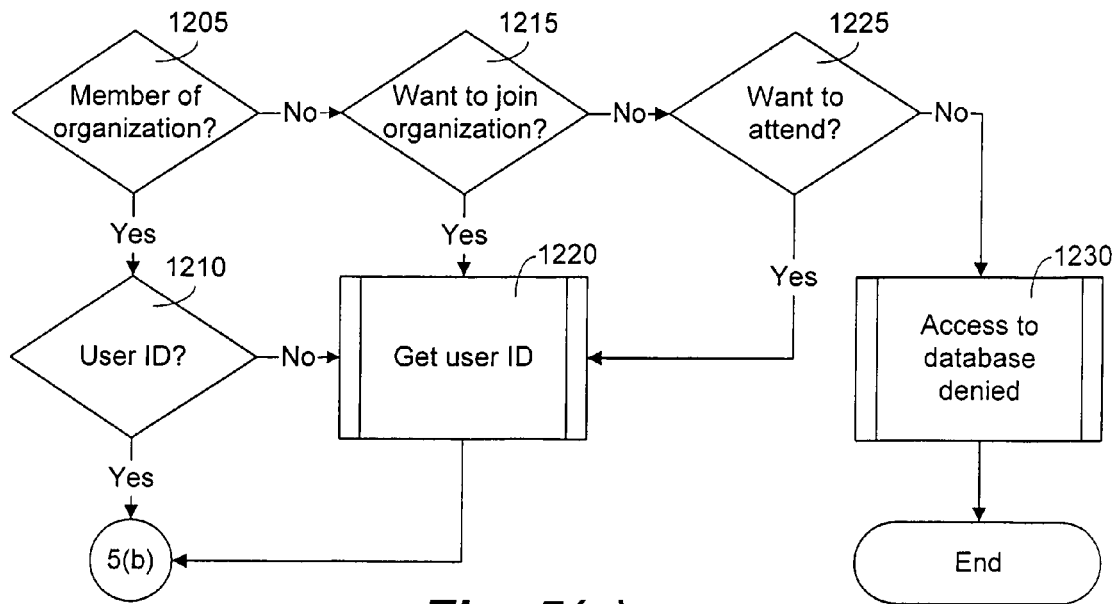
FIG. 5(a) shows a more particularized flowchart of a method used to gain access to a system according to the present invention.
Figure 5B:
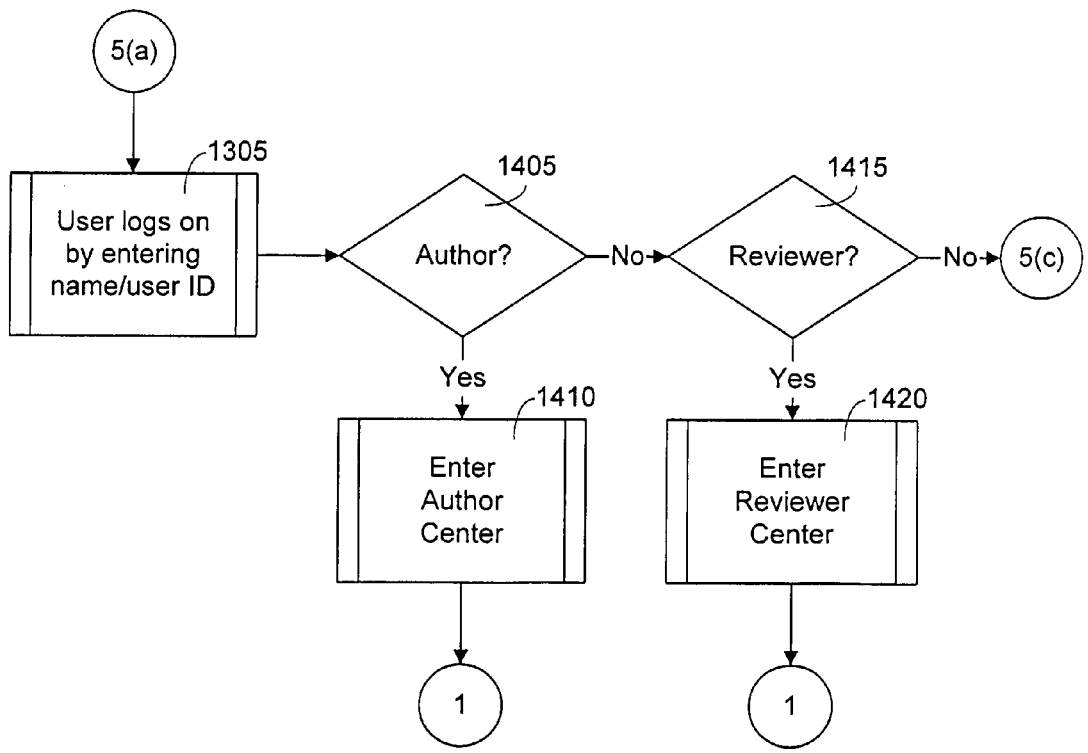
FIG. 5(b) illustrates a more particularized flowchart of a method used to identify authors and reviewers in the system of the present invention.
Figure 5C:
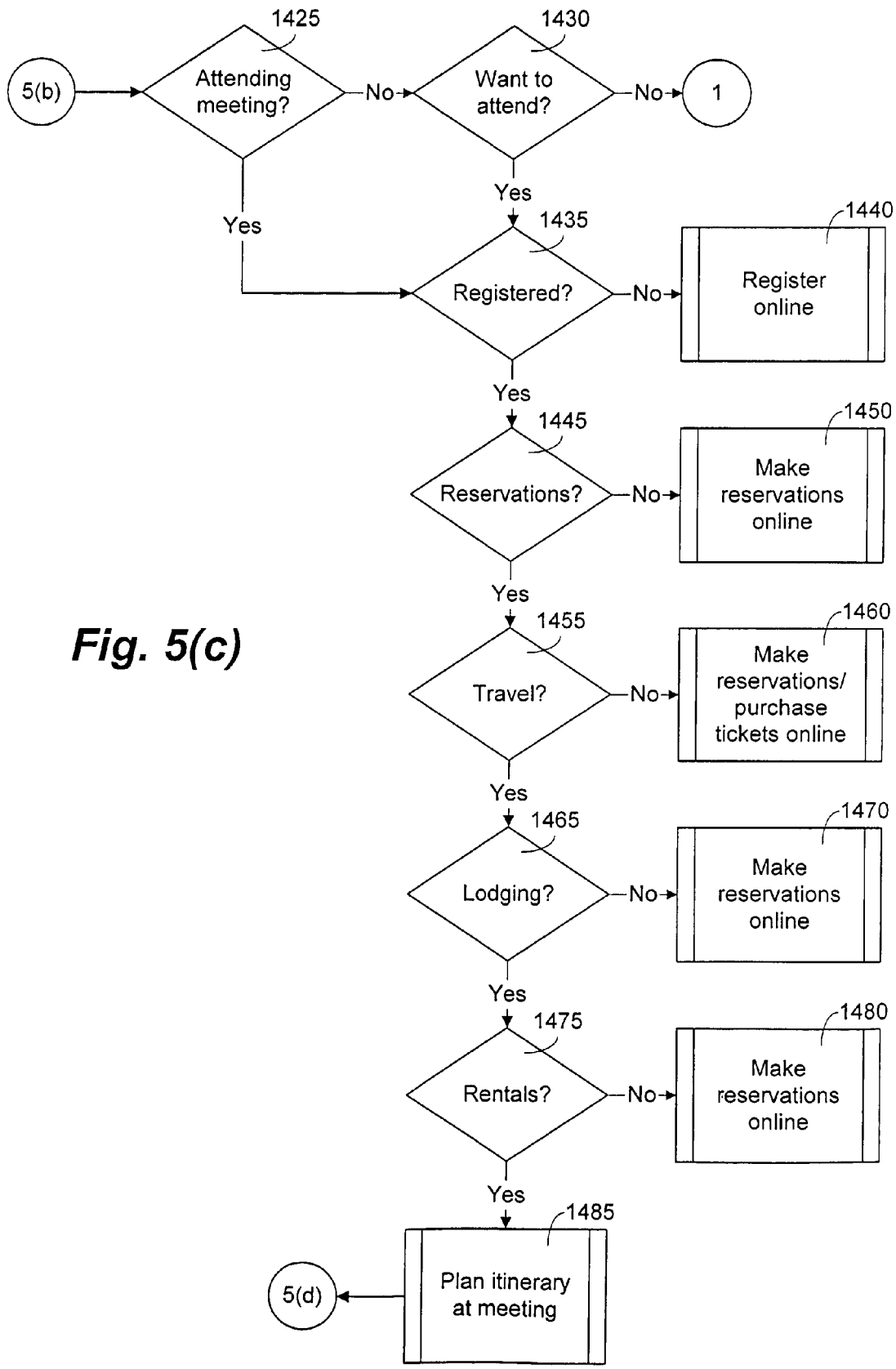
FIG. 5(c) depicts a more particularized flowchart of a method used to identify whether a user of the system intends to attend an organization's upcoming meeting, and to facilitate the attendance of such user at the meeting.
Figure 5D:
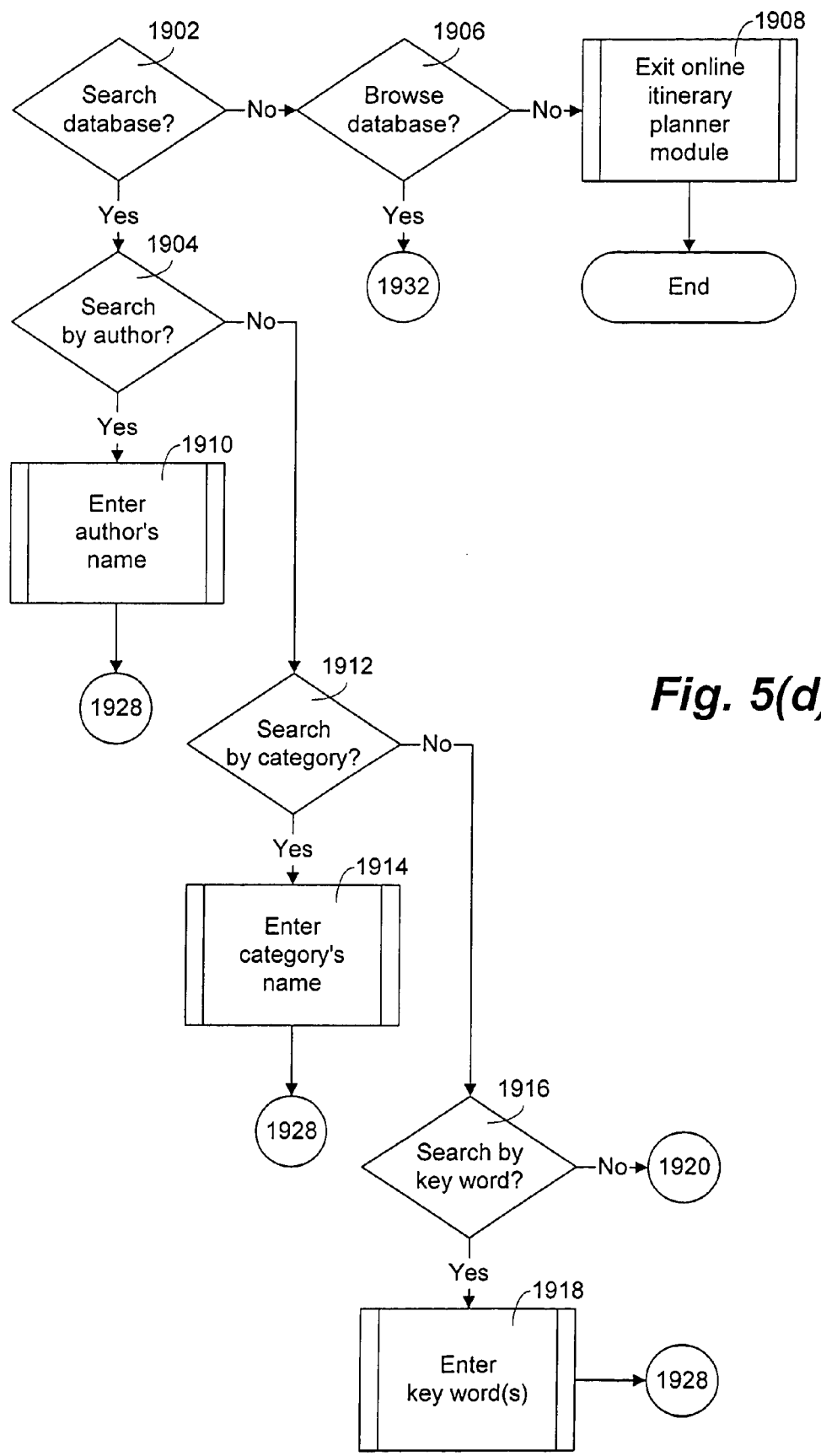
FIGS. 5(d), 5(e), and 5(f) show a more particularized flowchart of methods used to search the database and build an itinerary for a user attending the meeting.
Figure 5E:
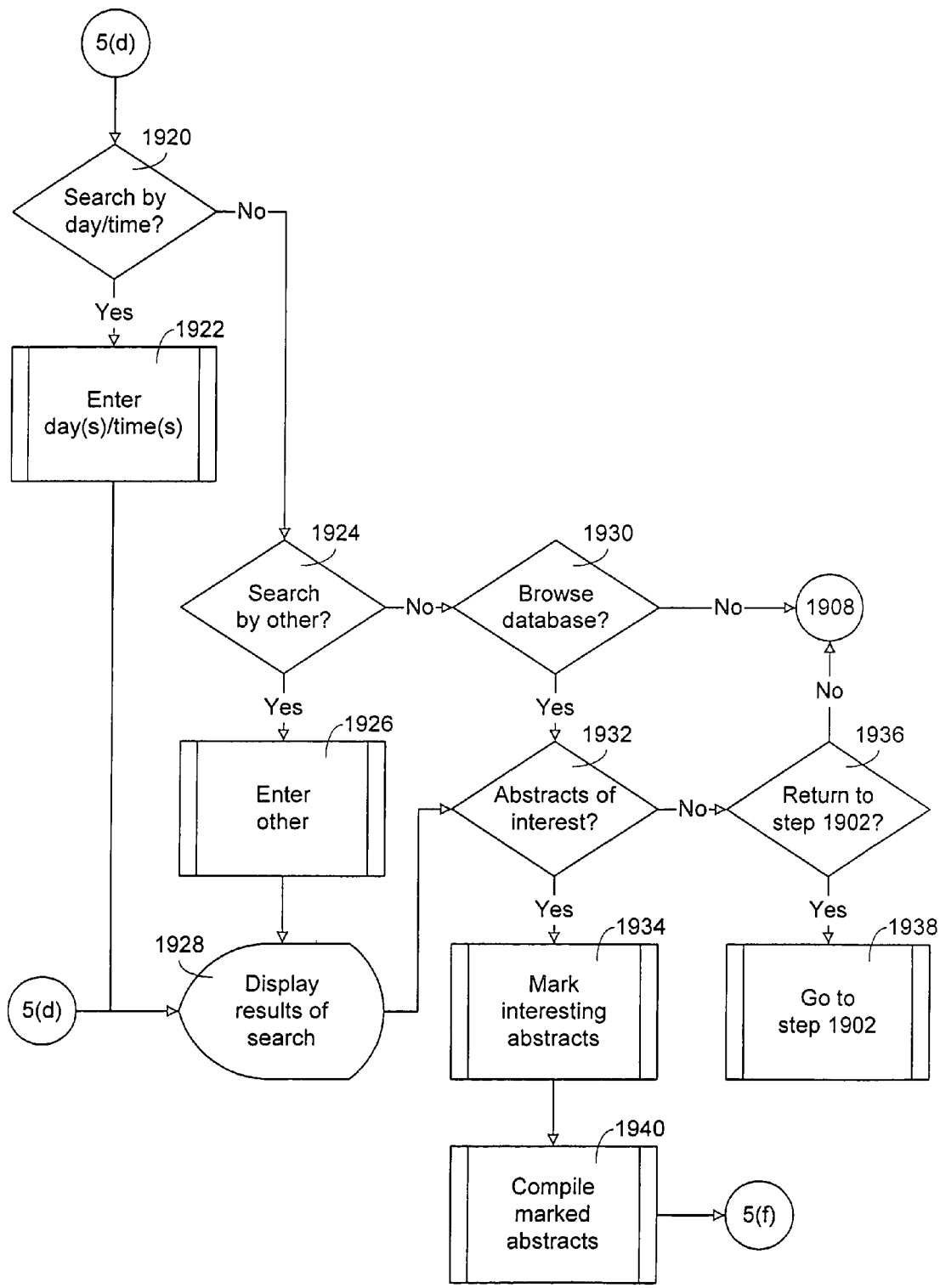
Figure 5F:
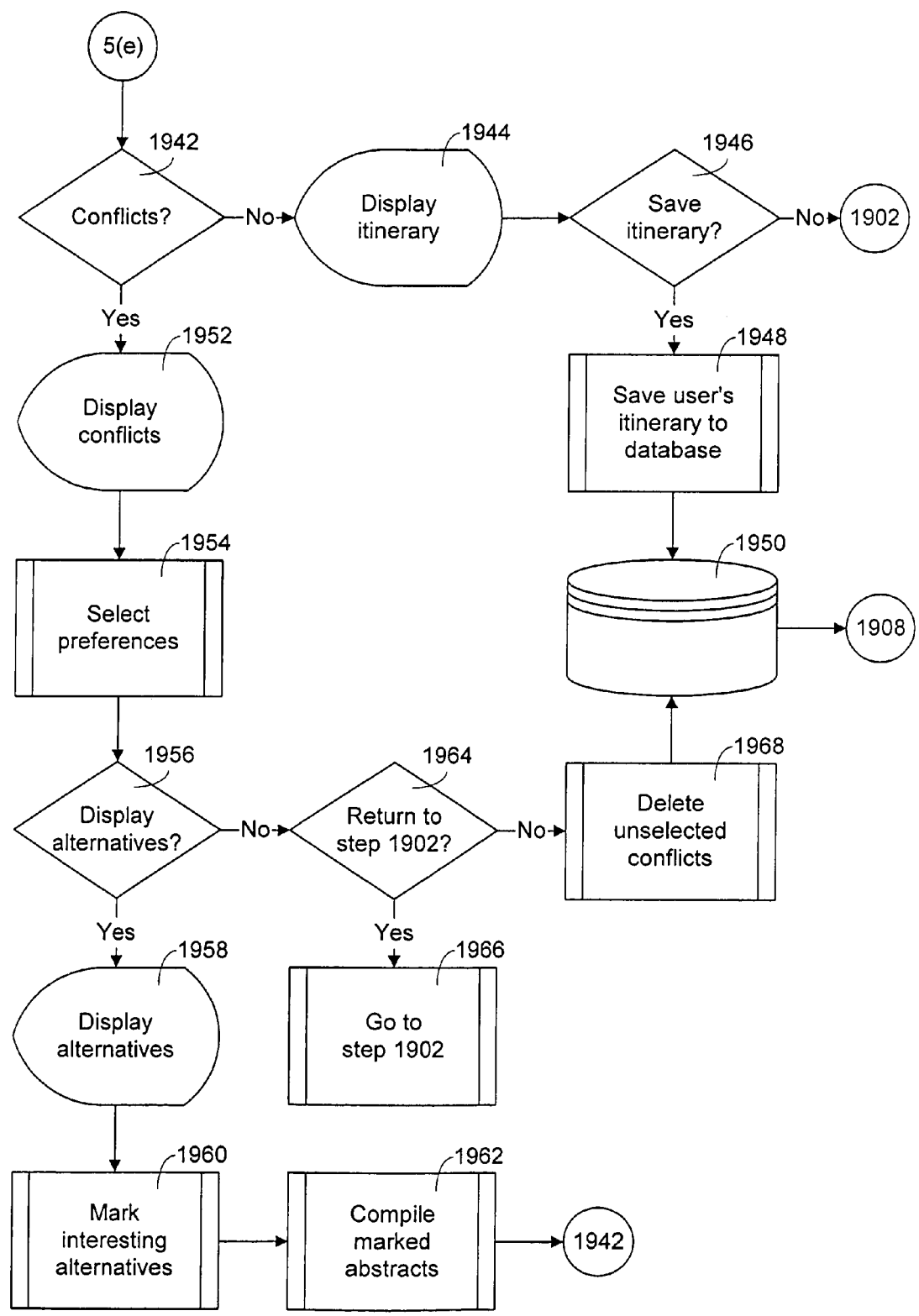
Figure 6A:
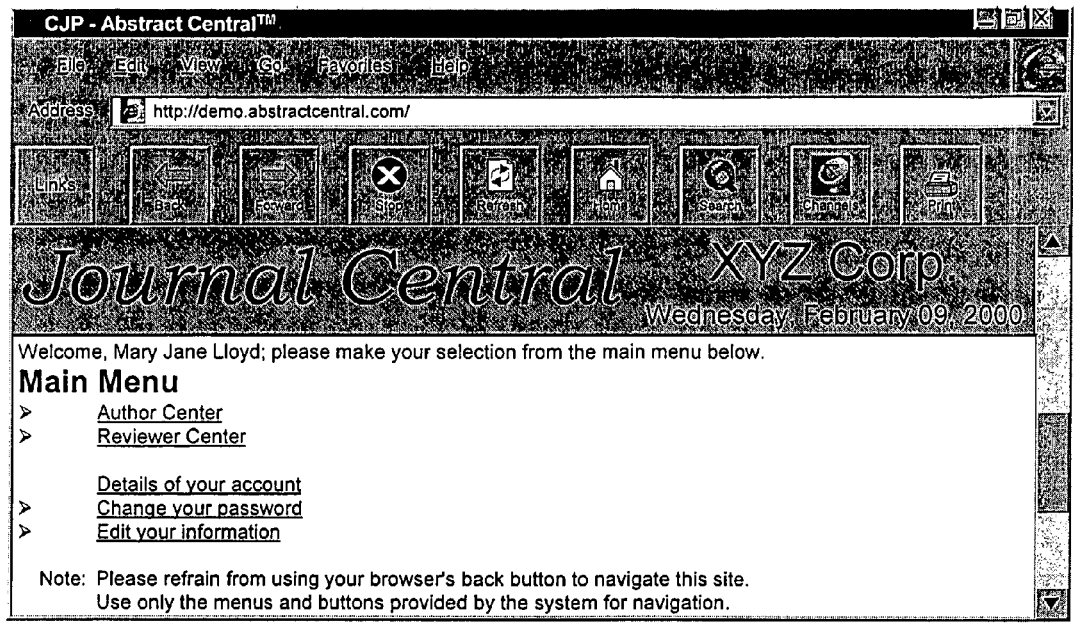
FIG. 6(a) illustrates a web page displaying the main menu of the online document processing system of the present invention.
Figure 6B:
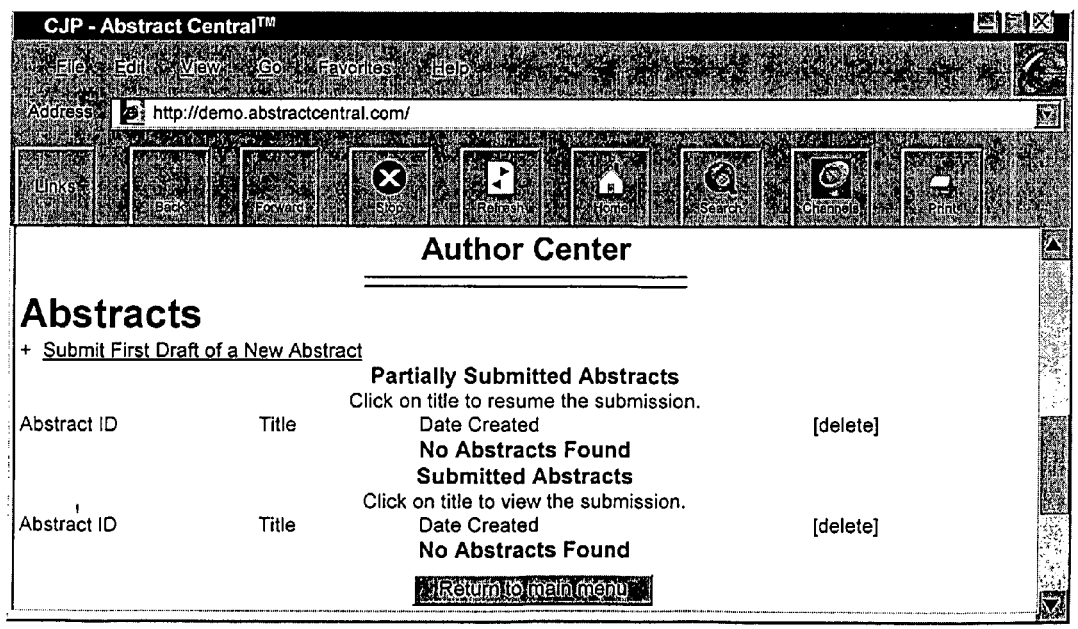
FIG. 6(b) illustrates a web page displaying an author center of the online document processing system of the present invention.
Figure 6C:
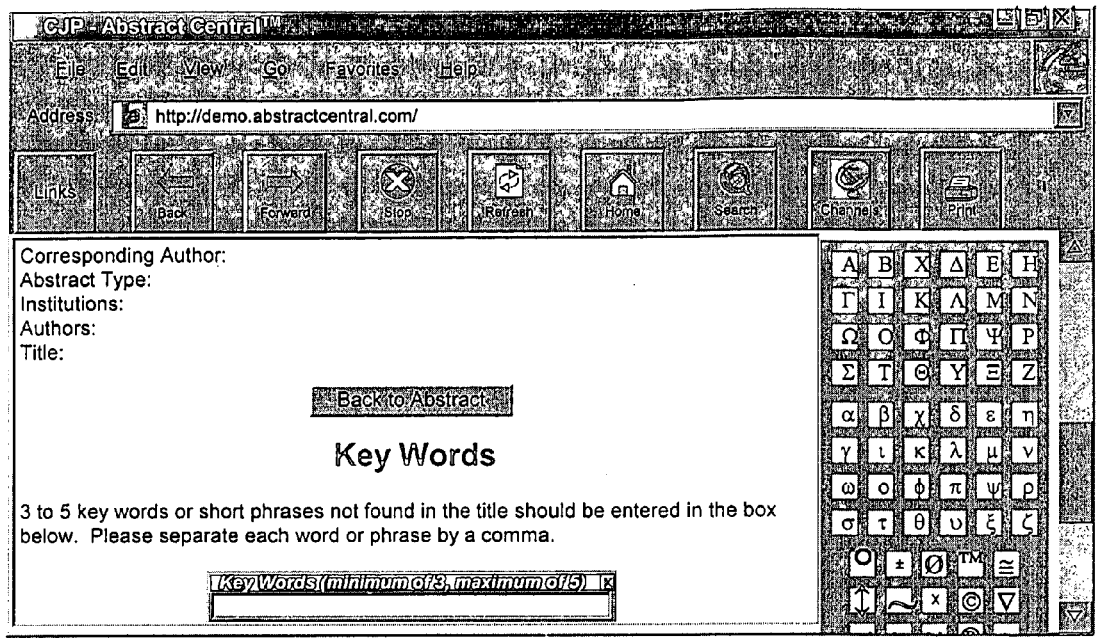
FIG. 6(c) illustrates a web page displaying the types of information required to be input by an author submitting a document in accordance with the present invention.
Figure 6D:
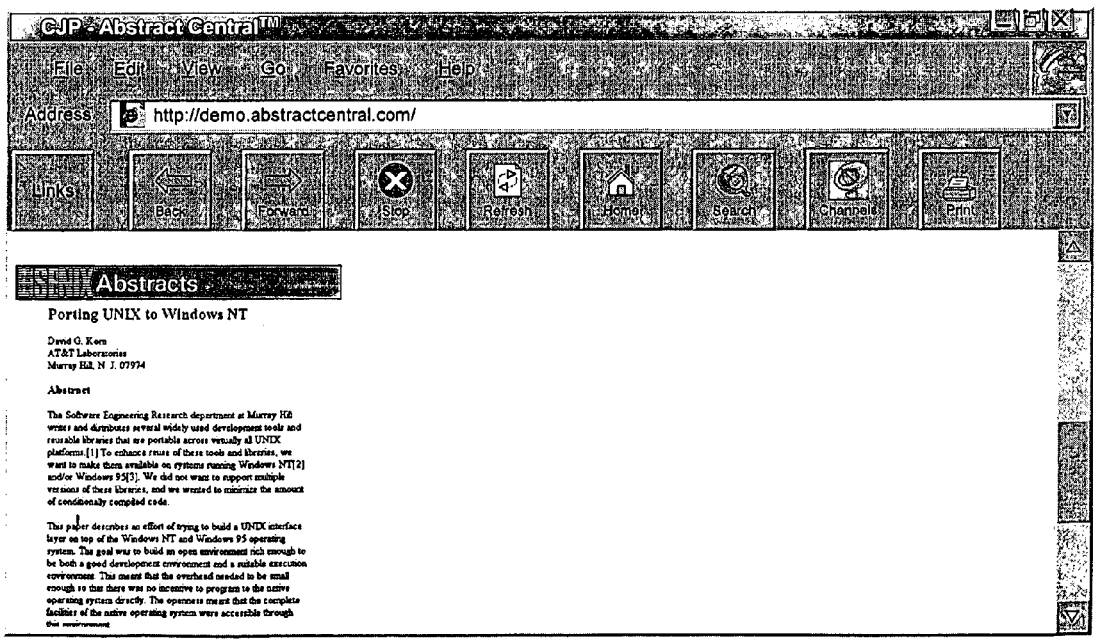
FIG. 6(d) illustrates a web page displaying an HTML proof of the document submitted by an author in accordance with the present invention.
Figure 7A:
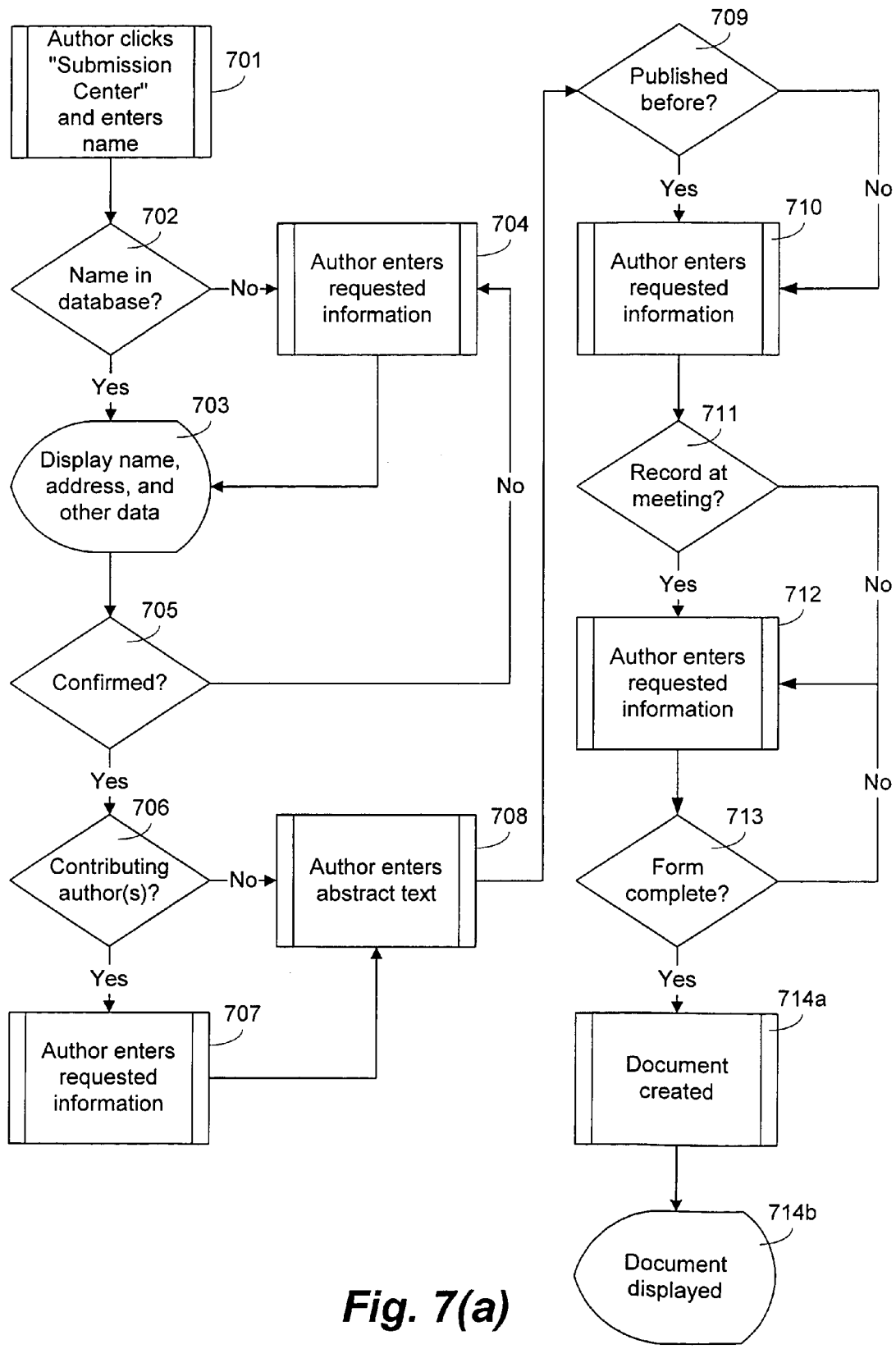
FIG. 7(a) depicts a more particularized flowchart of a method of submitting information by an author of a document.
Figure 7B:
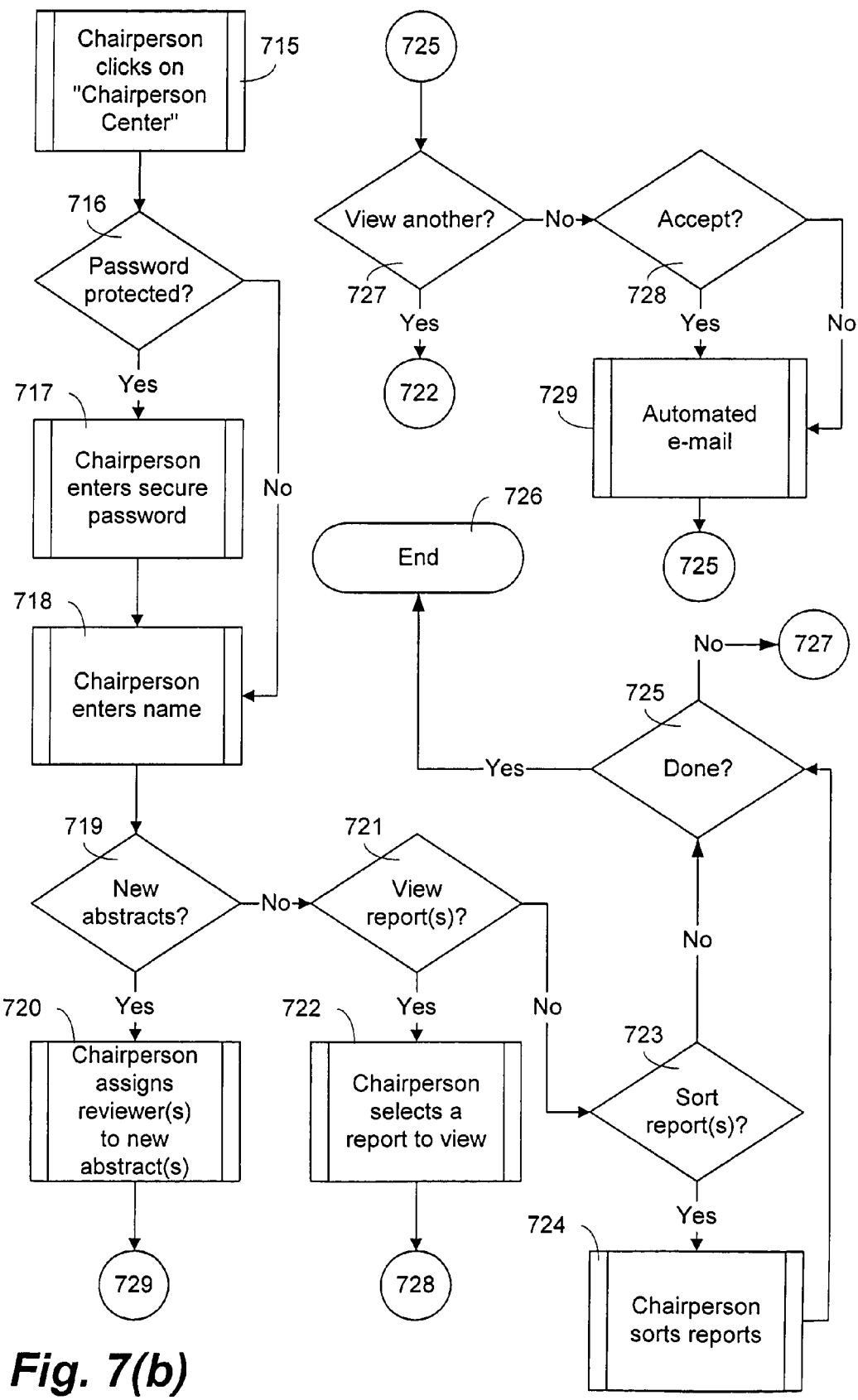
FIG. 7(b) depicts a more particularized flowchart of a method of delegating the review and approval of a document submitted by an author.
Figure 7C:
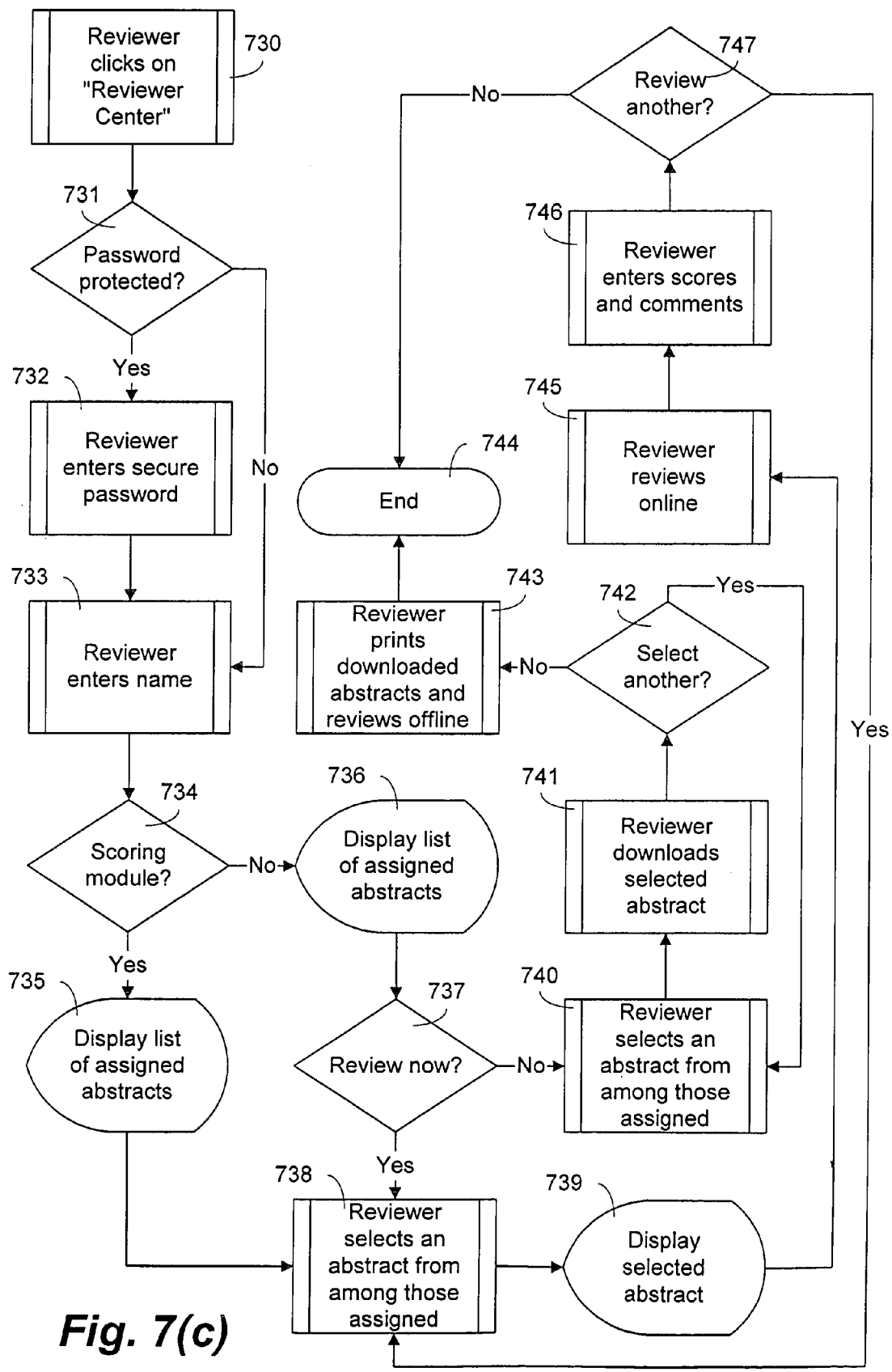
FIG. 7(c) depicts a more particularized flowchart of a method of reviewing a document submitted by an author.
Figure 7D:
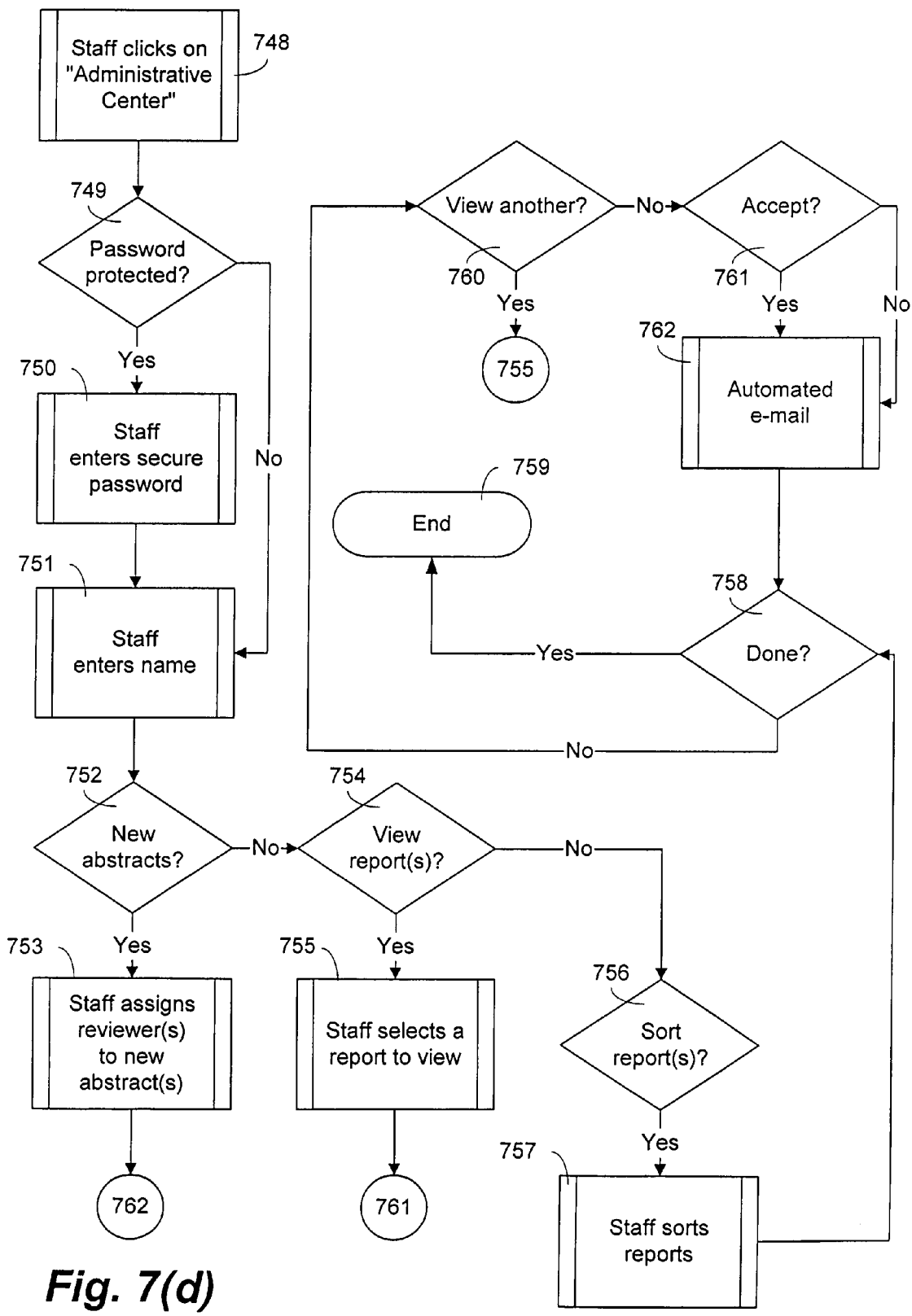
FIG. 7(d) depicts a more particularized flowchart of a method of administering the document publishing system and methods according to the present invention.

A generalized flowchart of the methods used to publish documents according to the present invention is shown in FIG. 4. A user first accesses the network at step 1100. The system 1000 then identifies the user at step 1200. If properly identified, the user then logs on to the system 1000 at step 1300, and identification of the user's function (e.g., author, reviewer, administrative staff, chair, meeting attendee) is made at step 1400. If an author, the user then enters or edits the document at step 1500 and, if satisfied, submits the document at step 1700. On the other hand, if the user is a reviewer, member of the administrative staff, or committee chair, the user then reviews the document at step 1600. If that user has any comments, such comments may then be entered at step 1800. Finally, if the user is merely a member of the society or a member of the general public, such user may use step 1900 to plan a personal itinerary for the meeting.

A more particularized flowchart of a method used to gain access to a system according to the present invention is shown in FIG. 5(*a*). Assuming the user is properly identified, system 1000 first queries whether the user is a member of the organization at step 1205. If so, system 1000 then queries whether the user has a user ID at step 1210. If not, the user is then asked whether he or she would like to join the organization at step 1215. If the user has a user ID, the method continues at FIG. 5(*b*). The same holds true for those users who are not members of the organization, but would like to join that organization. In either case, step 1220 is used to obtain a user ID, and the method continues at FIG. 5(*b*). If the user is not a member of the organization, and does not want to join the organization, he or she may still want to attend the upcoming meeting. Accordingly, at step 1225 the system 1000 determines whether this is the case. If so, system 1000 then prompts the user to obtain a user ID, and the method continues at FIG. 5(*b*). Otherwise, the user is denied further access to the database 200 at step 1230.

Access to the database 200, alternatively, can be provided for users to provide sufficient information for those users to make a reasoned decision as to whether they should attend the meeting, or to provide access to the meeting's records after it takes place. Accordingly, in this alternative a user may be permitted to access the system 1000 without the need of a user ID or password.

As shown in FIG. 5(*b*), the method continues at step 1305 by prompting the user to enter his or her name and/or user ID. System 1000 then queries the user at step 1405 whether he or she is an author. If so, system 1000 prompts the user to enter the author center at step 1410. A typical web page displaying the means to enter the author center is shown in FIG. 6(*a*). Referring back to FIG. 5(*b*), if the user is not an author, system 1000 queries whether the user is a reviewer at step 1415. If so, system 1000 prompts the user to enter the reviewer center (means for which is also shown in FIG. 6(*a*)) at step 1420. If not, the method continues at FIG. 5(*c*).

FIG. 5(*c*) depicts a more particularized flowchart of a method used to identify whether a user of the system intends to attend an organization's upcoming meeting, and to facilitate the attendance of such user at the meeting. System 1000 first determines whether the user wants to attend the meeting at step 1425. If so, system 1000 then queries whether the user is registered at step 1435. The same holds true if the user presently was not planning on attending the meeting, but indicated a desire to do so in response to the question at step 1430. If the user does not want to attend, further access to the database 200 is denied.

If the user is not registered, he or she may do so online with the system 1000 at step 1440. If already registered, system 1000 then asks whether the user needs any reservations (e.g., specific break-out sessions at the meeting, etc.) at step 1445. Such arrangements can then be made online at step 1450. Then, system 1000 queries the user as to his or her needs for travel arrangements at step 1455. The user may make those arrangements, or even purchase tickets, online at step 1460. In any event, system 1000 then asks the user whether he or she needs lodging at the meeting at step 1465. If so, reservations may be made online with the system 1000 at step 1470. If not, system 1000 then determines whether the user needs rentals at step 1475 (e.g., automobile, cellular telephone, etc.) at the meeting. If so, again, reservations for such rentals may be made online by the user at step 1480. If not, the user is then prompted to plan his or her itinerary at the meeting at step 1485. It should be readily apparent that system 1000 as presently disclosed may include means for making E-cash payments for such services.

Referring now to FIGS. 5(*d*), 5(*e*), and 5(*f*), a more particularized flowchart of methods used to search the database and build an itinerary for a user attending the meeting will now be described. If properly identified, the user can search the database 200 by answering the query at step 1902. If so, system 1000 questions the user whether he or she wants to search by author's name at step 1904. Otherwise, system 1000 determines whether the user would rather browse the database 200 at step 1906. If so, the method continues at step 1932. If not, the user exits the online itinerary planning module 800 at step 1908.

In the event that the user wants to search by author's name, system 1000 prompts the user to enter the author's name at step 1910, and the method continues at step 1928. If the user does not want to search by author's name, system 1000 then determines whether the user would like to search by category at step 1912. If so, the user is prompted to enter the category's name at step 1914, and the method continues at step 1928. If not, system 1000 then determines whether the user would like to search by key word at step 1916. If so, the user is prompted by system 1000 to enter the key word or words at step 1918, and the method continues at step 1928. If not, the method continues at step 1920 (or other similar queries can be made). For example, and referring now to FIG. 5(*e*), system 1000 queries at step 1920 whether the user would like to search by the day or time of any given presentation at the meeting. If so, the user is prompted at step 1922 to enter the day(s) or time(s), and the method continues at step 1928. If not, system 1000 determines whether the user would like to search by any other features at step 1924. If so, the user enters such other features at step 1926 and the results of the user's search are displayed at step 1928.

If not, the user is again asked whether he or she would like to browse the database 200 at step 1930. In the event that the user does not want to browse, he or she exits the itinerary planning module. Based on the displayed results of the user's search, or his or her browsing of the database 200. System 1000 then determines whether the user has any abstracts of interest at step 1932. If so, the user marks such interesting abstracts at step 1934, the marked abstracts are compiled at step 1940, and the method continues at FIG. 5(*f*). If not, system 1000 then determines at step 1936 whether the user again would like to search the database at step 1902. If so, system 1000 returns the user to the appropriate web page, at step 1938 and the method is repeated. If not, the user is prompted to exit the online itinerary planning module 800 at step 1908.

Having compiled the abstracts of interest, system 1000 then determines whether there are any conflicts of time or date at step 1942 (FIG. 5(*f*)). If not, system 1000 then displays the user's itinerary at step 1944, and the user is asked whether he or she would like to save that itinerary at step 1946. If a conflict or conflicts arise, they are displayed to the user at step 1952, and the user is prompted to select his or her preferences among the conflicts at step 1954. System 1000 then asks the user whether he or she would like to have any alternative presentations displayed at step 1956. If not, system 1000 asks whether the user would like to resume his or her search at steps 1964-1966. If the user wants to have alternatives displayed, they are displayed by system 1000 at step 1958, and the user is prompted to mark any interesting alternatives at step 1960. System 1000 then compiles the marked alternatives, at step 1962 and the method resumes at step 1942.

One advantage of the foregoing method is its ability to save the personal itineraries of users if desired. At step 1948, system 1000 save the user's itinerary to the database 200 in the event the user indicates yes to the query at step 1946. System 1000 will also delete unselected conflicts at step 1968, and the itinerary is saved to the database. In such a manner, attendees of the meeting are able to coordinate their itineraries with colleagues, etc. Examples of the web pages displayed in the foregoing process are shown in FIGS. 6(*a*), 6(*b*), 6(*c*), and 6(*d*). For example, FIG. 6(*a*) illustrates one web page displaying the main menu of the online document processing system of the present invention, FIG. 6(*b*) illustrates one web page displaying an author center of the online document processing system of the present invention, FIG. 6(*c*) illustrates one web page displaying the types of information required to be input by an author submitting a document in accordance with the present invention, and FIG. 6(*d*) illustrates a web page displaying an HTML proof of the document submitted by an author in accordance with the present invention.

Referring now to FIGS. 7(*a*) through 7(*d*), the submission, review, approval, and publishing processes of the present invention will now be described. FIG. 7(*a*) depicts a more particularized flowchart of a method of submitting information by an author of a document. The author initiates the process by clicking on the submission center (or author center as shown in FIG. 6(*a*)) at step 701. System 1000 then determines whether the author's name is in database 200 at step 702. If so, the author's name, address, and other pertinent information is displayed for confirmation at step 703. If not, the author is prompted by system 1000 to enter the requested information at step 704 (after which such information is also displayed for confirmation).

System 1000 then asks the author to confirm the information at step 705. If confirmed, the submitting author is asked by system 1000 whether there are any other contributing authors at step 706. If so, the submitting author is prompted at step 707 to enter information regarding his or her contributing authors. If not, as well as after the submitting author properly enters any contributing author information, system 1000 then prompts the author to enter the abstract text at step 708. Then, the author is asked by system 1000 whether the document has been published before (i.e., whether it is an original work) at step 709. If not, the method continues at step 710. If so, system 1000 prompts the user to enter certain information regarding such earlier publication at step 710. Other questions, such as whether the author would mind his or her presentation at the meeting to be recorded, may be asked at step 711. In any case, upon completion of such questions, system 1000 then prompts the user to enter certain other information at step 712. System 1000 then asks at step 713 if the author deems his or her submission form to be complete. If not, the author is prompted again by the system to enter any other requested information at step 712. On the other hand, if the form is complete, an HTML or PDF document is created "on the fly" by system 1000 at step 714*a*, and displayed to the author for his or her approval at step 714*b*.

FIG. 7(*b*) depicts a more particularized flowchart of a method of delegating the review and approval of a document submitted by an author. A committee chairperson initiates such process by clicking on the appropriate center button at step 715. If the web site is password protected, at step 716 system 1000 then prompts the chairperson to enter a secure password at step 717, and the process continues at step 718. Otherwise, system 1000 goes right to step 718 to prompt the chairperson to enter his or her name. Then, system 1000 will determine at step 719 whether there are any new abstracts for the chairperson to consider. If so, system 1000 prompts the chairperson to assign a reviewer or any number of reviewers of such new abstracts at step 720. The process then continues at step 729. If there are no new abstracts, system 1000 will then ask the chairperson whether he or she would like to view any reports at step 721. If so, the chairperson is then prompted by system 1000 at step 722 to select a report to view. If not, system 1000 prompts the chairperson to determine whether he or she would like system 1000 to sort reports at steps 723-724.

In the event the chairperson has assigned a reviewer or reviewers to any given abstract (as accomplished at step 720), system 1000 automatically sends an e-mail to such reviewers at step 729, advising them of the assignment. Likewise, in the event the chairperson has viewed a report (or abstract) as accomplished at step 722, system 1000 asks the chairperson if the report/abstract is acceptable. If so, an automated e-mail is sent to the person submitting the report (e.g., a reviewer) or abstract (e.g., a submitting author) advising them of that acceptance. The same is true if the report or abstract is not acceptable. Alternatively, the chair may generate his or her own report, which either inherently has the chair's approval or does not require such approval.

Ultimately, system 1000 asks the chairperson whether he or she is done at step 725. If so, system 1000 prompts the chairperson to exit the chair module 700. If not done, the chairperson is asked whether he or she would like to view another report or abstract at step 727, and the process continues at step 728.

FIG. 7(*c*) depicts a more particularized flowchart of a method of reviewing a document submitted by an author. The reviewer clicks on "Reviewer Center" (FIG. 6(*a*)) to initiate the review process at step 730. Of course, if the reviewer had received one of the above-mentioned automated e-mails, he or she would know to enter the Reviewer Center. If the Reviewer Center is password protected as determined at step 731, the reviewer is prompted by system 1000 at step 732 to enter his or her secure password. The reviewer then is prompted by system 1000 at step 733 to enter his or her name.

Then, system 1000 determines whether the reviewer would like to enter the scoring module at step 734. If so, system 1000 displays the reviewer's list of assigned abstract at step 735, and the reviewer selects an abstract from those assigned at step 738. If the reviewer does not want to enter the scoring module, system 1000 automatically displays his or her list of assigned abstracts at step 736, and the reviewer is asked at step 737 if he or she would like to review those abstract now (i.e., online). If so, the reviewer is prompted to select an abstract from the assigned at step 738. An alternative path of review is also possible if the reviewer does not want to review the abstracts online.

In the event that the reviewer wants to review the abstracts online, his or her selected abstract is displayed by system 1000 at step 739. The reviewer conducts his or her review at step 745, enters scores and/or comments at step 746, and asked if he or she would like to review another at step 747. If not, the review process ends at step 744, and the reviewer is prompted by system 1000 to exit the review module 500. While not shown in FIG. 7(*c*), the review module 500 may includes automated e-mails and saving to the database 200 as in the chair module 700.

In the event that the reviewer wants to review the abstracts offline, he or she selects an abstract from among those assigned at step 740. System 1000 provides means for the reviewer to download the selected abstract at step 741, queries the reviewer if he or she wants to select another abstract at step 742, and provides means for the reviewer to print the downloaded abstract at step 743. Included with such downloaded and printed abstracts can be a suitable scoring sheet. If the reviewer wants to view other abstracts, the process is looped back to step 740.

FIG. 7(*d*) depicts a more particularized flowchart of a method of administering the document publishing system and methods according to the present invention. Like the steps of chair module 500 illustrated in FIG. 7(*b*), the steps of administrative module 600 described in FIG. 7(*d*) are substantially similar. That is, the staff member initiates the process by clicking on the appropriate center button at step 748. If the web site is password protected, system 1000 then prompts the member to enter a secure password at step 749, and the process continues at step 750. Otherwise, system 1000 goes right to step 750 to prompt the member to enter his or her name at step 751. Then, system 1000 will determine at step 752 whether there are any new abstracts for the member to consider. If so, system 1000 prompts the member to assign a reviewer or any number of reviewers of such new abstracts at step 753. The process then continues at step 762. If there are no new abstracts, system 1000 will then ask the member whether he or she would like to view any reports at step 754. If so, the member is then prompted by system 1000 at step 755 to select a report to view. If not, system 1000 prompts the member to determine whether he or she would like system 1000 to sort reports at steps 757-757. Alternatively, the member may generate reports of his or her own, which do not require a decision and/or approval.

In the event the member has assigned a reviewer or reviewers to any given abstract (as accomplished at step 753), system 1000 automatically sends an e-mail to such reviewers at step 762, advising them of the assignment. Likewise, in the event the member has viewed a report (or abstract) as accomplished at step 755, system 1000 asks the member if the report/abstract is acceptable at step 761. If so, an automated e-mail is sent to the person submitting the report (e.g., a reviewer) or abstract (e.g., a submitting author) advising them of that acceptance. The same is true if the report or abstract is not acceptable.

Ultimately, system 1000 asks the member whether he or she is done at step 758. If so, system 1000 prompts the member to exit the administrative module 600 at step 759. If not done, the member is asked whether he or she would like to view another report or abstract at step 760, and the process continues.

Figure 8:
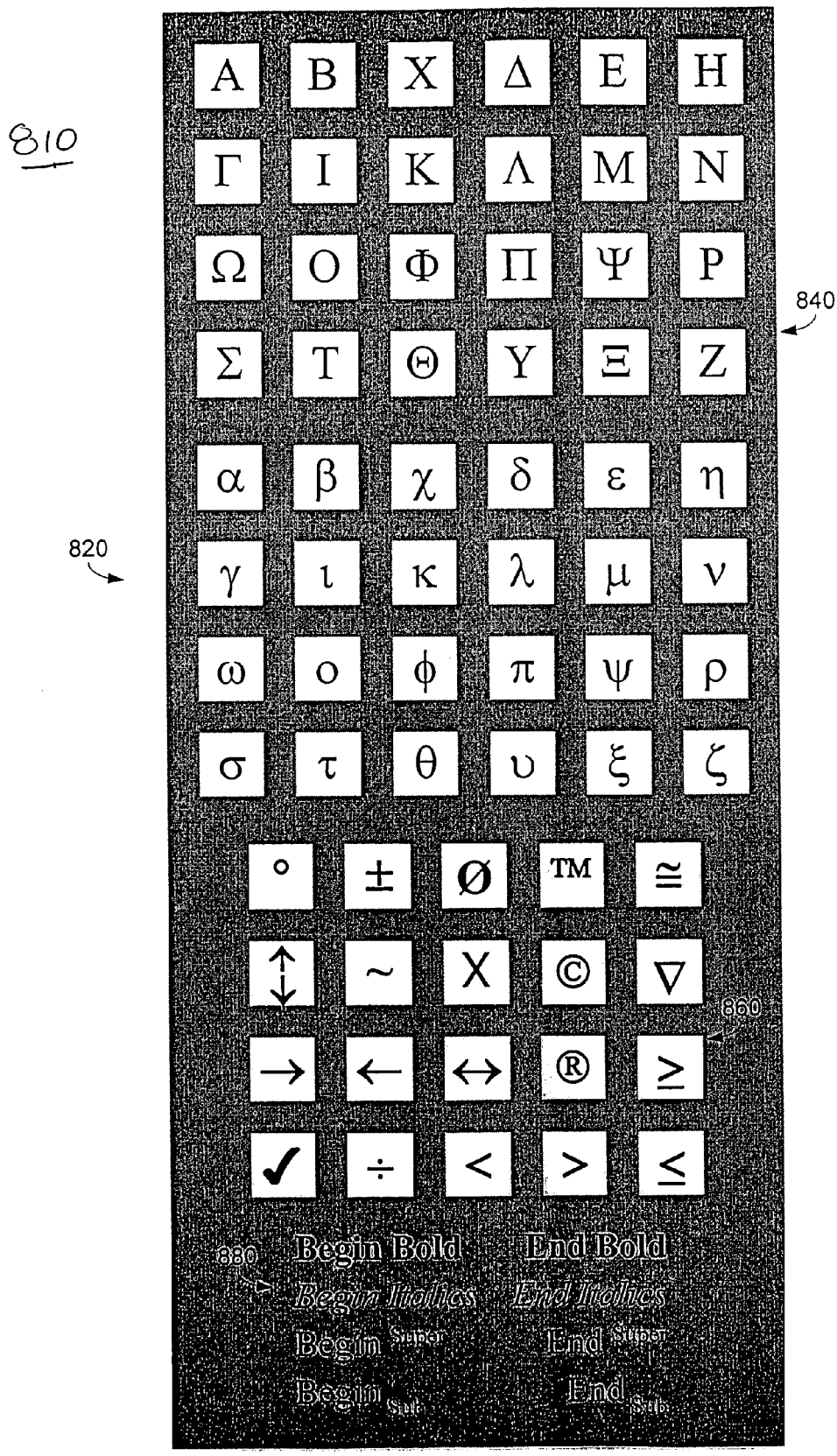
FIG. 8 illustrates in greater detail the symbols palette shown in FIG. 6(c).

One particularly important feature of the present invention, first shown in FIG. 6(*c*), is better illustrated in FIG. 8. FIG. 8 illustrates in greater detail a symbols palette according to the present invention. As noted herein above, there are problems associated with the many varied document formats and word processing software, which are solved by the system according to the present invention. System 1000 includes a plurality of appropriate filters whereby HTML documents can be created "on the fly" when an author submits his or her document in any format. Those filters take any documents cut and pasted by the author in the submission (or author) center, and translate those cut-and-pasted documents into an HTML document. Likewise, text originally entered by the author's keying in such text while online is immediately input to system 1000 in HTML format.

The symbols palette shown in FIG. 8, however, solves a particularly puzzling problem. All of the many-varied word processing programs and document formats have different key codes for different symbols. It is difficult, if not impossible, to enter such symbols online. Accordingly, the symbols palette 820 shown in FIG. 8 enables an author needing to enter such symbols only to do so by clicking on any one or more of the plurality of upper and lower case Greek letters 840, operators and indicators 860, or character formatting buttons 880. The codes are input to the system 1000, and the HTML proof that the author reviews shows the selected symbols as they should appear, regardless of the native word processing format used by the author.

With the system 1000 as described herein above, the author initially goes to the Internet site and the selects the author center to pull up the initial form for data entry. The initial entry screen of the sub-module requests that the author enter his/her identifying data, such as full name, town and/or institution, or in some instances, user ID code. The user's identifying data is transmitted to the provider's computer where the information is checked against existing authors within the database. If the author has previously either submitted data, or entered all the required information without submission, the confirmation sub-module is displayed. The confirmation sub-module verifies that the stored data for the author is correct and preferably offers the opportunity to update any information. Although updating can occur at later screens, this is the most efficient screen as the applicable databases have already been accessed.

In the event the required information on the author is not stored within the database, the system brings up the author entry sub-module that displays all of the required data for entry by the author. In some instances, security codes, required fields, etc. can be mandatory in order to proceed past this screen. The author's data is then stored within the provider's database for subsequent access.

Once the author is registered with the database, the title sub-module requests the proposed title of the abstract. The system preferably permits data entry through either direct keyboard entry or cut and paste from a word processor. The title can, if required by the publisher, be compared with existing titles within the database through a word search of word strings to prevent title duplication. In the event of duplication, the system can either notify the author at this stage or wait to request a title change once the abstract has been reviewed. In the event the system waits until after abstract review to request a title change, a notification of title duplication can be included in the transmission to the reviewer. After the title has been stored, the contributing author sub-module requests information on additional authors of the abstract. This information can consist of solely the contributing author's name or include the institution, address, etc. and is dependent upon the requirements of the specific publication. Preferably, if the required data on the contributing author is already in the system, it will be pulled up and the author will be required to verify that this information is correct, rather than having to reenter the data.

Upon transmission of the contributing author information, the abstract entry sub-module is displayed. The author enters the abstract by either typing or copying and pasting from a word processor. A spell check can be included that can be run on the abstract prior to submission. Since most abstracts are limited to a specific number of words, a word counter is provided to enable the author to edit the abstract to the appropriate length. In the preferred embodiment, the maximum and minimum number of words required by the publisher are also included. The program can also indicate the number of words to be deleted or added. The word count suitably comprises a JAVA script that interacts with the author's computer (e.g., going into a submission text box to count the existing words). The word count program is provided with the parameters set by the specific publication or society for a particular submission. The program counts the words in the submission text box and compares the number of words within the form with the programmed parameters, notifying the author accordingly. Due to the space restrictions by the societies and publishers, each abstract must be within the maximum number of allowable words. Therefore, the disclosed system prevents the author from continuing within the system unless the words fall within the programmed range. A word count button is provided for the author to check the number of words during editing, enabling the author to continually check during the addition or deletion of words. Preferably the system automatically runs the word count program prior to enabling the author to proceed from the abstract entry sub-module to the publisher to author query sub-module. This final automatic word count can be eliminated providing the previous word count is within the allowable range.

The maximum word count is heavily influenced by the society's future publication requirements. The exact typefaces and styles for the title, author data and abstract, the size of each of these elements, the number of abstracts published per page and the anticipated number of abstracts for publication all effect the volume of the publication. This is then weighted against the budget to determine the number of words per abstract. This number is the basis for the determination of the maximum words allowable and is subsequently adjusted according to society preferences and criteria.

In order to accommodate the various symbols that can be unique to technical writing, a character palette is including in the abstract entry screen. The symbols palette 820 that is illustrated in FIG. 8 consists of various symbols that can be entered into the applicable location within abstract or title as the author is working. The character palette 810 is unique in that it is not bound by a word processor, but rather is a dynamic method of entry. What is seen on the palette is the graphic representation, what is seen in the text is the program specific palette character codes. The JAVA programming creates the program specific codes that are embedded into the body of the ASCII text. To enter a symbol, the author places the cursor at the entry location and positions the mouse arrow over the desired symbol on the palette. The JAVA then places the program specific code at the location of the cursor. For example, to enter the alpha symbol, the author would click onto the α on palette 820. What would appear at the cursor location, however, would be the code, such as [alpha]. Once the abstract is submitted, a conventional database program (e.g., SQL) searches the fields looking for coding, and substituting the appropriate image file of the character indicated by the program specific code, or a for the [alpha]. Since the ASCII symbols will not transfer over the Internet, the original submission of ASCII text cannot include the actual symbol. However, when the system converts the ASCII into HTML, the program specific symbol codes are read by the system and the small image files, located on the system, are inserted and displayed.

The program uses an "either/or", enabling the program to substitute either a programmed font symbol or an online graphic substitution. This method of replacement is not limited to symbols, but can also be incorporated with various graphics. As the disclosed system has sufficient versatility for use in many areas, it would be impossible to include all the symbols within one palette. Therefore, different palettes can be provided, with the displayed palette being either automatically selected based on the publication or manually selected by the author. Furthermore, a pull down list of palettes can be included adjacent the displayed palette, enabling the author to switch between palettes during data entry. In some areas of technology, enabling the author to transmit pictures, logos, etc. is extremely beneficial, although not necessary in all applications. In another embodiment, the automatic replacement program can be personalized by the author. A "create palette" feature presents the author with a blank palette and at least one of the programmed palettes. Using the click and drag method, the author pulls the desired symbols from the programmed palette into the personal palette. Thus, the author is able to combine the multiple programmed palettes into a single personalized palette. This personalized palette is saved under the author's ID and appears for each submission. As the codes are already programmed in, the conversion to program specific code is not affected.

In an alternate embodiment, a JAVA program automatically reads the abstract, locating any symbols within the abstract that require replacement. While the text is in the submission text box, the JAVA program scans the abstract, automatically replacing any symbols recognized by the program with the program specific codes as described heretofore. To keep the program running at a rapid rate, the number of recognizable symbols must be kept to a minimum. Therefore, separate programs are preferably used for different applications, i.e., math related, medical, material sciences, etc. All programs can be made available to the author through a look up chart to enable the author to run one or more programs on the submission. In the event a symbol is either not included in the automated programs or unrecognizable, the author can use the palette 300 to override the automatic program entry.

The foregoing palettes must run on the author's computer rather than the server since ASCII cannot retain the symbol images during transmission to the server. Any of the palettes disclosed herein can also be programmed for specific characters.

Upon completion of data entry, the abstract is transmitted and the author is presented with the publisher to author query sub-module that has been designed to the specific submission requirements of the publisher. These would include whether the author will be presenting, or has presented, the data at a meeting; whether this abstract has been published elsewhere; whether this abstract is only one piece of a larger project, etc. Once the author has answered, and submitted, these queries, the system takes the typed abstract and converts it into a HTML format for proofing by the author. Once the author transmits the answers to the publisher's queries, the HTML proof is generated and brought onto the screen in the proofing sub-module. Alternatively, the author can transmit the abstract to the system server prior to completion of the publisher to author query page. In the returned HTML format the symbols, entered through use of the symbols palette 820, are displayed correctly. The proofing screen is automatically provided with an abstract number that is used by the author and publisher identify the specific abstract. An abstract number is automatically generated by the system using a format that meets with the specific society's requirements. This "on the fly" production of a proof, conversion of ASCII data into HTML and its subsequent display is unique to the system.

The conversion is through the use of a database (e.g., SQL) that permits the user to write a specific application that is driven by the database. The use of custom programmed calculation fields enables the program to convert from the ASCII into the HTML language. The system takes each field of the data sent in ASCII, and applies the appropriate formulas embedded within the program relating to that specific field. An interfacing program (e.g., Lasso, CDML, or SQL) is programmed to recognize the specific coding used with the disclosed systems and enables communication between the web and the database. In this embodiment, all data is saved on the server in ASCII and converted, as needed, into the formats required for the individual application. The language used for saving the data is dependent upon the base program and can change according to the program.

In the event the author requires the submission of a table within the abstract, the disclosed system provides a unique table builder. A table builder button is provided which, when activated, prompts the author for the designated number of rows and columns. Once provided with the parameters, the system builds a blank table consisting of empty data fields. The author enters, or copies and pastes the data into the blank table field by field. The special palette enables the author to include symbols into the table. Once the author has indicated completion of the table, the system displays an instantaneous HTML proof of the table. The table is also incorporated as part of the HTML proof. Although for the submission of abstracts the location of the table is generally predetermined by the society, a drag and place feature can be incorporated in some embodiments to enable the author to reposition the table. The system also supports multiple tables within each submission.

A further addition to some abstracts is the inclusion of graphics. The system disclosed herein accepts graphics (e.g., graphs, photographs, multimedia files, data feeds, and streaming video) that are uploaded by the author in a format compatible with the core system. Acceptable format(s), such as JPEG at 72 dots per inch, can be indicated by the system. In computer systems that accept graphics, the submitting author can have a screen where he would be instructed to "browse" his computer for the graphics associated with the submission and transmit the designated files to the system server. The graphics are included in the final HTML proof. As with the tables discussed above, system 1000 supports multiple graphic images that can be placed around and/or within the text. The drag and place feature can also be incorporated with the graphics feature. Graphics can also be combined with the table(s) to enable an author to provide graphic explanation of a photograph.

All of the data submitted by the author is placed, at the time of entry, into data fields. Each of these entry fields are tied to hidden calculation fields within the background program that are specifically programmed to instruct the currently running program what to do with the data contained within the entry field. Some of these calculation fields are used to tag the data within the entry field for output to various media. The media can include reading by a web browser, a page layout system or prepared for CD ROM software or any other media or medium applicable for the final application. The tags in the calculation fields are specially programmed to meet the output specifications of the society or publisher. Thus, if a society is presenting a seminar and providing a hard copy accompaniment, but no CD ROM, the web browser and page layout tags in the appropriate calculation field would be programmed but not the CD ROM calculation field. The entry data is received and stored in ASCII, the tags, however, determine the appearance of the data when it leaves the system. Within these tags would be the font size and style, margins, spacing, etc., to enable the finished product to automatically adhere to predetermined society formats.

An approval choice is also provided, enabling the author to indicate that the HTML proof is either "Approved" or "Not Approved". In the event the author has changes to make on the proof, the system provides the ability to edit the text online through an edit sub-module. Once the author is ready to submit the abstract, the transmit, or approval, button is "pressed", activating a transmission sub-module to send and store the abstract to the provider's database. The author has now completed all of the requirements for the submission of the abstract and exits the system.

Once the abstract is sent by the author, it is placed within the system for review by an assigned reviewer. The exact process for assigning the reviewer can vary from society to society and is customized within the system for each society. Each abstract can be assigned to a specific reviewer by a society or publication administration member or automatically by the system.

To automatically assign the reviewer, the system is provided with a list of reviewers and their qualifying criteria. The qualifying criteria can include items such as specialty and maximum number of abstracts to be assigned or any other qualification set forth by the society. As the abstracts are submitted, they would be matched against the reviewer's criteria and automatically assigned. In instances where there are more than one reviewer per specialty, once the maximum number of abstracts are assigned, the system automatically starts moving the abstracts to the next qualified reviewer. In instances where more abstracts are submitted than qualified reviewers, the system will alert the administrative module 600 of the overload.

For assignments by the society or publisher, the abstract is transmitted to the society's administrative division. Since the administrative module 600 has two distinct functions within the disclosed system, the function of assigning a reviewer has been referred to as the chair module 700. Although the description herein makes reference to a chairperson doing the abstract assignments, this can be undertaken by any person designated by the society or publisher. The chair module 700, as illustrated in FIG. 7(*b*), provides the administrative department, or section chairpersons, the opportunity to manage the review of abstracts, either overall or in a specifically assigned category. The chair module 700 would generally be accessed before the submission is sent to the review module 500, although this can depend upon the particular society and their screening procedures. Once into the system web site, the chairperson enters the chairperson section sub-module and, after clearing security measures, is presented with a list of the submitted abstracts. The chairperson can, in this sub-module, designate reviewers from their specific pool of reviewers (based on such factors as the reviewer's workload, performance, timeliness, etc.), and make accept/reject/revise decisions before the abstract goes to review, etc. By assessing abstracts prior to the assignment of a reviewer, the abstracts that do not qualify can be immediately rejected. This prevents the society from paying reviewers for abstracts that would automatically be disqualified. The abstracts that are not accepted are marked accordingly by the chairperson and rejection e-mails are automatically generated and sent to the author in an e-mail submodule. Remaining abstracts are then assigned by the chairperson to the appropriate reviewer. As the chairperson assigns abstracts for review by specific reviewers, the system automatically generates e-mails notifying the reviewer of the presence and location of the abstract(s) for review. Once completed, the chairperson exits the site at an exit sub-module. As an alternative to manually assigning reviewers, the chairperson can, once the rejected abstracts are eliminated, have the system automatically designate reviewers as noted above.

Once transmitted from the chair module 700, the abstract is accessible from the review module 500 by the publisher's reviewers. To enter the review module 500, the reviewer goes to the system web site on the Internet. If the reviewer enters the site in response to an automatic e-mail notification, the site address can be included in the e-mail for rapid access to the site. Once into the web site, the reviewer enters the reviewer center sub-module and enters his/her name and password. Once the reviewer is cleared through password verification, there is a choice as to whether to view the summary list of assigned abstracts, choosing the abstracts to review, for subsequent scoring through a scoring sub-module, or reviewing and scoring abstracts online. These options are provided in order to enable the reviewer to go into the abstracts to review and print out the abstracts for later review and subsequent scoring in the scoring module. In the event the reviewer reads, scores and makes comments on the abstract online, at one time, a read/score module is used rather than the review sub-module. For security reasons, the reviewer has access only to the abstracts sent for specific review. However, if it is beneficial for a publisher or society to make a complete list of the abstracts for review accessible to one or more reviewers, to system can be modified accordingly. In many instances, the society does not want the abstracts to be saved on any place other than the system database, preventing any alteration of the submitted abstracts within the system. If, however, it is preferred by the society, the program can be customized to enable the abstracts to be saved on the reviewer's computer.

Entry into the abstract review sub-module enables the reviewer to view a summarized list of abstracts requiring review. The list of abstracts presented to the reviewer can include various data that would be of assistance to the reviewer in selecting the order of the abstracts to review. The abstract information can include a "due date", subject matter, number of related abstracts to be reviewed by the reviewer, etc. The reviewer can choose one or all of the abstracts to be reviewed and print these specific documents for later review. This enables the reviewer to select the order in which he or she will review the designated abstracts, i.e. by subject matter, urgency, or any other personal criteria.

Printing from HTML on an abstract by abstract basis is a problem due to inherent HTML printing problems. To resolve this issue, the abstracts to be printed are selected, without viewing the file, and sent to a single HTML file that is subsequently printed. Alternatively, the selected abstracts can be converted into a PDF file that is subsequently printed.

Once the abstracts have been read, the reviewer reenters the system and goes to the scoring sub-module to score and comment on each read abstract. The scoring sub-module screen is preferably customized to the publisher or society to provide a consistency in scoring. The reviewer enters the score and any comments applicable to the abstract, transmitting the score to the system for database storage. The score is stored in the database for access by the publisher's staff personnel in a decision sub-module. Once transmitted, the reviewer has the option of exiting the site or reviewing additional abstracts.

The read/score sub-module enables the reviewer to pull up a HTML version of the abstract for online review. The reviewer reads and immediately scores and comments on each abstract online. Once the reviewer has completed the abstract in the read/score sub-module, sub-module is automatically entered, giving the reviewer a choice as to exit or review an additional abstract. The scores on the abstracts can either be sent to the database upon completion of scoring or as a batch file upon going off line.

Since each reviewer can score abstracts or publications for more than one division of the same society, or publication for the same publisher, it is beneficial to maintain an independent database on each reviewer. Data collected on the reviewers for evaluation can include abstract review turn around time, number of abstracts assigned overall or within a period of time, number of outstanding abstracts, average scores, specialty areas, etc. The reviewers can be divided down based on the individual division or publication, specification criteria, or merged to provide an overall evaluation of the reviewer. Thus, in the event one division of a society wanted to assign abstracts to a reviewer who had previously reviewed for another division of the society, a performance review could be produced based on the reviewer's work with the other division(s).

The administrative module 600 is available only to the society's staff and is accessible from the system's database through the Internet web site. The staff person enters the administrative module 600 and enters their name and password in the security sub-module to enable personnel verification in the provider's database. Once accepted, the staff person is provided with the various administrative options available through an options sub-module. The options sub-module can be specifically designed to meet the particular needs of the publisher or be user programmable. In this example, the options sub-module enables the staff person makes the choice to view reports based on author, categories, etc. through the report sub-module, assign final decisions to accept, reject, or revise in the decision sub-module, and assign accepted abstracts for presentation through the assignment sub-module.

The decision sub-module enables the staff person to review the scores received from the reviewer using these scores as a basis for determining whether the abstract is accepted. Other methods of making the determination can also be used dependent upon the specific publication's requirements. Preferably the abstracts are marked as to accept, reject or revise and are automatically separated and distributed to the appropriate sub-module by the system.

If an abstract is rejected or contains comments for revision, the e-mail sub-module notifies the author. The accepted abstracts are sent to the report sub-module and, in some instances, also sent to the e-mail sub-module to send the initial notice of acceptance.

In the report sub-module, the staff person has the ability to group the abstracts, for the production of reports, by any number of predetermined or programmable criteria. Optimally archived abstracts will be accessible from this screen. In some embodiments the system can run a search for plagiarism based on previously submitted abstracts and articles independently entered into the database. The plagiarism check can be set to include any documents that have above a predetermined percentage of matching words or phrases, i.e. all abstracts having at least 90% matching phrases. Running the reports enables the staff person to handle smaller, related areas for organization of the abstracts. In the event the abstracts are related to a presentation, the reports provide easier assignment of presentation times, rooms, etc. rather than attempting to manipulate all of the presentations at one time. For publication, the reports enable the staff to sort by a predetermined criteria for arrangement within the publication. The versatility of the report system also provides the staff with the ability to manipulate the abstracts in any manner required for the end use. For example, publishing abstracts on a single subject taken from several presentations, taking certain authors from various publications and arranging a seminar, etc.

The assignment sub-module enables the staff person to assign the author a presentation time and location, schedule around lunch and coffee breaks, maintain subject matter in contiguous presentations, etc. As the schedule is created, it is saved within the provider's database, thereby enabling access from various sources without concern for conflicting scheduling. The schedule is preferably dynamic in that the presentations can easily be rearranged up until the predetermined cut off date. Once the schedule is finalized, the staff person can generate automatic e-mails to the authors regarding their schedule time and location. Return confirmation e-mails can also be requested and automatically categorized and recorded. Upon generation of the e-mails, the staff person exits the site at the exit sub-module.

The e-mail sub-module can also advise the author of a rejection or revision requirement. Depending upon the data entered by the staff person in the decision sub-module, the e-mails will be automatically generated to advise the author of acceptance, rejection or revision. Depending upon the society or publisher's requirements, the staff persons can add comments regarding revision or rejection at the decision sub-module and/or the comments can be added by the reviewer in scoring sub-module or read/score sub-module.

The disclosed system provides the further advantage of enabling the accepted abstracts to be available for online viewing by the public. Thus, once a meeting is scheduled and advertised, prospective attendees can view the program online and determine whether they will attend and schedule the presentations. To view the schedule, viewers enter an online publication module, and enter the provider's web site. A search sub-module enables the viewer to search the abstracts based on various presented options, such as keyword, topic, author, etc. The titles of abstracts matching the viewer's criteria are displayed at the result sub-module. The viewer can select the abstracts to be read by clicking on a title, whereby the abstract sub-module displays the HTML abstract, author, title and presentation time. In the preferred embodiment the abstract sub-module also provides an "Add to Itinerary" selection to enable the viewer to add this presentation to a pre-loaded itinerary for the meeting.

The "add to itinerary" feature is available through the combination of an instructional files, such as JAVA script, and a program specific functionality available within the core database. An itinerary format, such as a day planner, is provided for personal use by each attendee. When an attendee chooses to schedule attendance at a seminar, he or she activates the itinerary screen. Once the attendee finds a presentation to attend, the "add to itinerary" button is activated. Each abstract is provided with coded calculation fields within the database that contain the day, time and title of the presentation and name of the presenter. The activation of the "add to itinerary" button transmits the included scheduling data from the calculation fields on the database to the appropriate location on the day planner sheet, preventing the filled fields from the entry of conflicting meeting times. A search feature can be provided on the itinerary form that enables the viewer to search for specific subject matter and/or presenter. The search feature can be placed on the system, directly interacting with the database to provide a list of presentations that meet the search criteria. The scheduled set of events, such as lunch, breaks, receptions, etc. can be automatically blocked off on the itinerary. Although the itinerary can be saved on the author's computer, the data from the itinerary can also be transmitted to the server, thereby enabling the administration to monitor attendance. The itinerary can be printed from and saved onto the author's computer.

It should be noted that the system can be programmed to collect demographic information on any of the modules. Typically, this information would be gathered from the online publication module and submission module to provide the society with information regarding third party accesses. Depending upon the organization utilizing the system, other modules can also provide data pertinent to the operation of the organization.

In a presently preferred embodiment of this invention to database 200 comprises a SQL-type database. System 1000 also preferably uses conventional PHP software to quickly convert and display input and stored information "on the fly" in HTML format. Various modifications of the methods and systems disclosed herein above are possible without departing from the true spirit and scope of the present invention. It should be understood, therefore, that within the scope of the following claims, the present invention may be practiced otherwise than as has been specifically described in the foregoing embodiments.

I claim:

1. A computer-implemented method for managing and reviewing documents, said method comprising:
   providing a submission module to enable a submitter to provide a submission for publication consideration to the system, said submission module being adapted to upload text and graphics, accept flexible submission file formats, produce at least one selectable output format of said submission, produce complete proofs of said submission for user approval, shield an identity of at least one reviewer from said submitter of said submission, capture data to facilitate a peer review process, enable immediate review of said submission, display submission status at any time, and generate automatic email correspondence;
   providing an administrative module to enable administration of the system, said administrative module being adapted to search a database and display results, track said submission, track author data, track reviewer and chairperson data and performance, track decisions, automatically notify late reviewers/chairpersons, grant or change user permissions, and download said submission for editing and production;
   providing a chair module to enable delegation of review and approval of the submission, said chair module being adapted to display full text and graphics for review of said submission, enter accept/reject/revise decisions into the database at any stage, search for and select reviewers from the database, view reviewer history and current workload, invite reviewers to review all aspects of said submission, add comments/notes to said submission, and generate automatic email correspondence;
   providing a review module to enable review of the submission, said review module being adapted to provide all aspects of said submission to said reviewer for peer review, provide a common score sheet specific to a meeting to an chairperson, and enable entry of accept/reject/revise recommendations for said submission into the database; and
   providing a planning module to enable scheduling a presentation relating to content of said submission during said meeting.

2. The method of claim 1, wherein said providing an administrative module step further comprises:
   receiving order decisions that provide at least an arrangement for content of said submission; and
   determining contents of at least one meeting or journal based on said order decisions.

3. The method of claim 1, wherein said submission includes data in the form of text, images, graphics, or multimedia.

4. The method of claim 1, wherein said submission includes correspondence having at least one of information about an author, subject matter of said submission, proposed publication dates, proposed presentation dates, or proposed meetings or journals for inclusion.

5. The method of claim 1, wherein said providing a chair module step further comprises enabling a chairperson to at least one of add, delete, change or select reviewers from the database by at least one of a plurality of clients.

6. The method of claim 1, wherein a computer system automatically produces a list of reviewers from said database.

7. The method of claim 1, wherein at least one of a plurality of clients produces said reviewers.

8. The method of claim 1, wherein said reviewers are based on qualifying criteria, wherein said qualifying criteria includes at least one of (i) a reviewer's area of specialty, (ii) a reviewer's prior review history, (iii) a reviewer's professional associations, (iv) a reviewer's availability, or (v) said author's preference for or against at least one reviewer.

9. The method of claim 1, wherein said computer system providing a submission module step requires authentication of identity from at least one of a plurality of clients.

10. The method of claim 1, wherein said providing a submission step further comprises requiring at least one of identification or authentication.

11. The method of claim 1, wherein said providing a review module step further comprises:
receiving a revision to said submission, wherein the author of said submission provided said revision based on said received at least one review; and
providing said revision to at least one reviewer for additional review.

12. The method of claim 1, wherein said providing a planning module step further comprises providing at least a date, time, and location of presentation for said submission.

13. The method of claim 1, wherein said further comprising providing a plurality of clients access to said modules via at least one of the Internet, an extranet, or an intranet.

14. The method of claim 1, wherein said providing a review module step further comprises reporting acceptability information compiled from a received at least one review.

15. The method of claim 1, wherein an identity of said author and at least one reviewer who agrees to review said submission are not provided to at least one of a plurality of clients.

16. The method of claim 1, wherein an identity of an author and at least one reviewer who agrees to review said submission are not provided to at least one of said plurality of clients.

17. The method of claim 1, wherein said providing an administrative module step further comprises providing access to predetermined content of a document when said submission includes a document.

18. The method of claim 1, further comprising publishing predetermined content from said database.

19. The method of claim 1, further comprising enabling receipt of said submission in a plurality of different formats.

20. The method of claim 1, wherein the review module further comprises enabling multiple reviewers to review all aspects of said submission simultaneously.

21. The method of claim 1, further comprising shielding an identity of said author from at least one reviewer.

22. A computer program product comprising a computer useable medium including control logic stored therein, said control logic enabling management and review of documents, said control logic, when executed by a processor, causes the processor to carry out steps comprising:
providing a submission module to enable a submitter to provide a submission for publication consideration to the system, said submission module being adapted to upload text and graphics, accept flexible submission file formats, produce at least one selectable output format of said submission, produce complete proofs of said submission for user approval, shield an identity of at least one reviewer from said submitter of said submission, capture data to facilitate a peer review process, enable immediate review of said submission, display submission status at any time, and generate automatic email correspondence;
providing an administrative module to enable administration of the system, said administrative module being adapted to search a database and display results, track said submission, track author data, track reviewer and chairperson data and performance, track decisions, automatically notify late reviewers/chairpersons, grant or change user permissions, and download said submission for editing and production;
providing a chair module to enable delegation of review and approval of the submission, said chair module being adapted to display full text and graphics for review of said submission, enter accept/reject/revise decisions into the database at any stage, search for and select reviewers from the database, view reviewer history and current workload, invite reviewers to review all aspects of said submission, add comments/notes to said submission, and generate automatic email correspondence;
providing a review module to enable review of all aspects of the submission, said review module being adapted to provide all aspects of said submission to said reviewer for peer review, provide a common score sheet specific to a meeting to an chairperson, and enable entry of accept/reject/revise recommendations for said submission into the database; and
providing a planning module to enable scheduling a presentation content of relating to said submission during said meeting.

23. The computer program product of claim 22, wherein said managing and reviewing software further causes the processor to carry out steps comprising:
enabling the processor to receive order decisions from at least one staff person, wherein said order decisions provide at least an arrangement for at least one version of said submission in at least one meeting or journal; and
enabling the processor to determine contents of said at least one meeting or journal based on said order decisions.

24. The computer program product of claim 22, wherein said submission includes data in the form of text, images, graphics, or multimedia.

25. The computer program product of claim 22, wherein said submission includes correspondence including at least one of information about an author, subject matter of said submission, proposed publication dates, proposed presentation dates, or proposed meetings or journals for inclusion.

26. The computer program product of claim 22, wherein additions, deletions, changes, or selections to said reviewers are provided to said database by a chairperson via at least one of a plurality of clients.

27. The computer program product of claim 22, wherein a computer system automatically produces said a list of reviewers to a chairperson from said database.

28. The computer program product of claim 22, wherein at least one of a plurality of clients produces a list of reviewers.

29. The computer program product of claim 22, wherein a list of reviewers is based on qualifying criteria, wherein said qualifying criteria includes at least one of (i) a reviewer's area of specialty, (ii) a reviewer's prior review history, (iii) a reviewer's, professional associations, (iv) a reviewer's availability, or (v) said author's preference for or against at least one reviewer.

30. The computer program product of claim 22, wherein a computer system requires authentication of identity from at least one of a plurality of clients.

31. The computer program product of claim 22, wherein said providing a submission module requires at least one of identification or authentication.

32. The computer program product of claim 22, wherein said providing a review module step further comprises:
   enabling the processor to receive a revision to said submission, wherein the author of said submission provided said revision based on a received at least one review; and
   enabling the processor to provide said revision to at least one reviewer for additional review.

33. The computer program product of claim 22, wherein said providing a planning module step further includes at least a date, time, and location of presentation for said submission.

34. The computer program product of claim 22, wherein a plurality of clients access said modules via at least one of the Internet, an extranet, or an intranet.

35. The computer program product of claim 22, wherein said providing a review module further reports acceptability information compiled from at least one review.

36. The computer program product of claim 22, wherein information about at least one of a author or a author and at least one reviewer who agrees to review said submission are not provided to at least one of a plurality of clients.

37. The computer program product of claim 22, wherein information about an author and at least one reviewer who agrees to review said submission are not provided to at least one of a plurality of clients.

38. The computer program product of claim 22, wherein said providing an administrative module step further provides access to predetermined content of a document when said submission includes a document.

39. The computer program product of claim 22, wherein said managing and review software, when executed by the processor, further causes the processor to carry out steps including publishing predetermined content from said database.

40. The computer program product of claim 22, further comprising enabling receipt of said submission in a plurality of different formats.

41. The computer program product of claim 22, wherein the review module further comprises enabling multiple reviewers to review all aspects of said submission simultaneously.

42. A system for managing and reviewing documents, said system comprising:
   a processor;
   a memory; and
   a database,
   wherein said memory carries thereon managing and reviewing software, comprising:
   a submission module to enable a submitter to provide a submission to the system, said submission module being adapted to upload text and graphics, accept flexible submission file formats, produce at least one selectable output format of said submission, produce complete proofs of said submission for user approval, shield an identity of at least one reviewer from said submitter of said submission, capture data to facilitate a peer review process, enable immediate review of said submission, display submission status at any time, and generate automatic email correspondence;
   an administrative module to enable administration of the system, said administrative module being adapted to search the database and display results, track said submission, track author data, track reviewer/chairperson data and performance, track decisions, automatically notify late reviewers/chairpersons, grant or change user permissions, and download said submission for editing and production;
   a chair module to enable delegation of review and approval of the submission, said chair module being adapted to display full text and graphics for review of said submission, enter accept/reject/revise decisions into the database at any stage, search for and select reviewers from the database, view reviewer history and current workload, invite reviewers to review all aspects of said submission, add comments/notes to said submission, and generate automatic email correspondence;
   a review module to enable review of all aspects of the submission, said review module being adapted to provide all aspects of said submission to said reviewer for peer review, provide a common score sheet specific to a meeting to an chairperson, and enable entry of accept/reject/revise recommendations for said submission into the database; and
   a planning module to enable scheduling a presentation relating to content of said submission during said meeting.

43. The system of claim 42, wherein said providing a submission module further comprises:
   receiving order decisions from at least one staff person, wherein said order decisions provide at least an arrangement for content of a at least one version of said submission in for at least one meeting or journal; and
   determining content of said at least one meeting or journal based on said order decisions.

44. The system of claim 42, wherein said submission includes data in the form of text, images, graphics, or multimedia.

45. The system of claim 42, wherein when said submission includes correspondence includes at least one of information about an author, subject matter of said submission, proposed publication dates, proposed presentation dates, or proposed meetings or journals for inclusion.

46. The system of claim 42, wherein additions, deletions or selections from said reviewers in said database are provided by a chairperson by at least one of a plurality of clients.

47. The system of claim 42, wherein a computer system automatically produces a list of reviewers to a chairperson from said database.

48. The system of claim 42, wherein at least one of a plurality of clients produces a list of reviewers.

49. The system of claim 42, wherein a list of reviewers is based on qualifying criteria, wherein said qualifying criteria includes at least one of (i) a reviewer's area of specialty, (ii) a reviewer's prior review history, (iii) a reviewer's professional associations, (iv) a reviewer's availability, or (v) said author's preference for or against at least one reviewer.

50. The system of claim 42, wherein a computer system requires authentication of identity from at least one of a plurality of clients.

51. The system of claim 42, wherein said providing a submission step further requires at least one of identification or authentication.

52. The system of claim 42, said providing a chair module step further comprises:

enabling a processor to receive a revision to said submission, wherein the author of said submission provided said revision based on a received at least one review; and enabling a processor to provide said revision to at least one reviewer for additional review.

53. The system of claim 42, wherein said presentation information includes at least a date, time, and location of presentation for said submission.

54. The system of claim 42, wherein a plurality of clients access said computer system modules via at least one of the Internet, an extranet, or an intranet.

55. The system of claim 42, wherein said providing a review module further reports acceptability information compiled from a received at least one review.

56. The system of claim 42, wherein an identity of an author and at least one reviewer who agrees to review said submission are not provided to at least one of a plurality of clients.

57. The system of claim 42, wherein information about an author and at least one reviewer who agrees to review said submission are not provided to at least one of said plurality of clients.

58. The system of claim 42, wherein said providing a submission module further provides access to predetermined content of a document when said submission includes a document.

59. The system of claim 42, wherein said managing and review software, when executed by the processor, further causes the processor to carry out steps including publishing predetermined content from said database.

60. The system of claim 42, further comprising enabling receipt of said submission in a plurality of different formats.

61. The system of claim 42, wherein the review module further comprises enabling multiple reviewers to review all aspects of said submission simultaneously.

* * * * *